United States Patent
Celli, Jr. et al.

(10) Patent No.: US 9,522,756 B1
(45) Date of Patent: Dec. 20, 2016

(54) MAGNETIC FASTENING SYSTEM AND METHOD FOR CHANGE PARTS

(71) Applicant: Pneumatic Scale Corporation, Cuyahoga Falls, OH (US)

(72) Inventors: Paul Celli, Jr., Saint Petersburg, FL (US); John Toth, Medina, OH (US); Robin Thompson, Parrish, FL (US); Patrick Reeves, Brooksville, FL (US)

(73) Assignee: PNEUMARIC SCALE CORPORATION, Cuyahoga Falls, OH (US)

( * ) Notice: Subject to any disclaimer, the term of this patent is extended or adjusted under 35 U.S.C. 154(b) by 0 days.

(21) Appl. No.: 14/858,312

(22) Filed: Sep. 18, 2015

Related U.S. Application Data

(63) Continuation of application No. 13/459,266, filed on Apr. 30, 2012, now Pat. No. 9,149,919.

(60) Provisional application No. 61/480,360, filed on Apr. 28, 2011.

(51) Int. Cl.
| | |
|---|---|
| *B25B 27/14* | (2006.01) |
| *B65B 59/04* | (2006.01) |
| *B67C 3/22* | (2006.01) |
| *B23P 19/04* | (2006.01) |

(52) U.S. Cl.
CPC ............. *B65B 59/04* (2013.01); *B23P 19/04* (2013.01); *B67C 3/22* (2013.01); *Y10T 408/56343* (2015.01)

(58) Field of Classification Search
USPC ...................................................... 29/281.1
See application file for complete search history.

(56) References Cited

U.S. PATENT DOCUMENTS

| | | | | |
|---|---|---|---|---|
| 4,722,126 A | * | 2/1988 | Kraic ................... | F01C 1/086 29/281.1 |
| 4,934,037 A | * | 6/1990 | Schuerg .................. | B25B 5/14 269/287 |
| 6,170,140 B1 | * | 1/2001 | Deavers .................. | B25B 27/00 29/271 |
| 6,874,219 B2 | * | 4/2005 | Hanssen ............ | G11B 17/0287 269/52 |
| 7,634,853 B2 | * | 12/2009 | Nguyen ................ | B25J 9/1687 29/283 |

(Continued)

*Primary Examiner* — Alvin Grant
(74) *Attorney, Agent, or Firm* — Ralph E. Jocke; Walxer & Jocke

(57) ABSTRACT

A fastening system and method to removably attach change part components to a capping or filling machine in order to adapt a general purpose machine for use with a specific size or shape container. The fastening system and method uses magnetic forces to pull component parts into alignment and to interlock portions of interchangeable components. In addition, a blocking component is interposed between two other interchangeable component parts or within mushroom slots, securing the components in place, aided by biasing magnets. This system and method relies on a combination of mechanical and magnetic forces by using mechanical forces to reinforce or supplement biasing magnetic forces, and vice versa, creating a durable connection that will withstand the rigors of the filling and capping process, yet which is simple to assemble and disassemble without tools. The less intricate component parts are less prone to damage during assembly, use or disassembly.

23 Claims, 18 Drawing Sheets

(56) References Cited

U.S. PATENT DOCUMENTS

| | | | | |
|---|---|---|---|---|
| 7,765,662 B2* | 8/2010 | McKown | ............... | B23Q 3/062 269/48.1 |
| 8,528,887 B2* | 9/2013 | Humfeldt | ............. | B64D 11/003 269/291 |
| 2002/0024763 A1* | 2/2002 | Drake | .................... | G11B 17/03 360/99.12 |

* cited by examiner

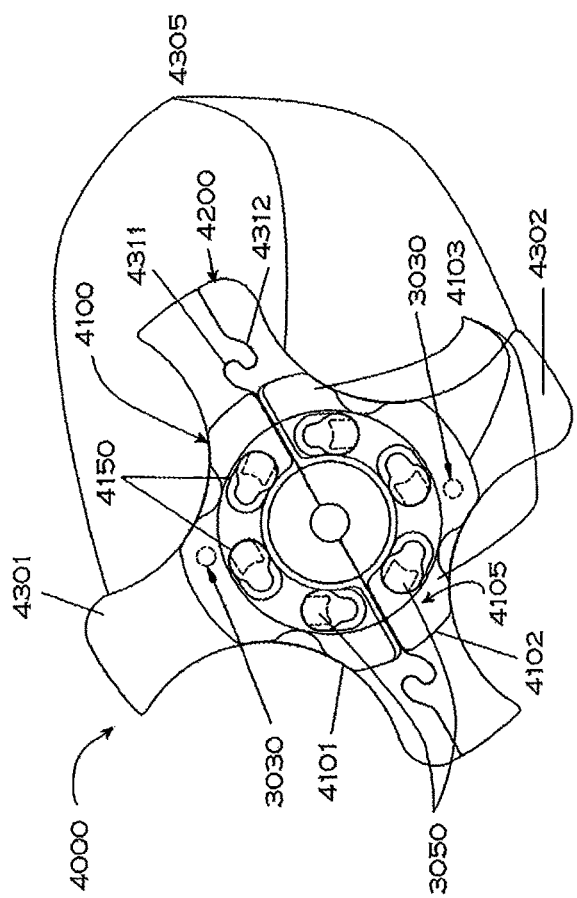
FIG 12
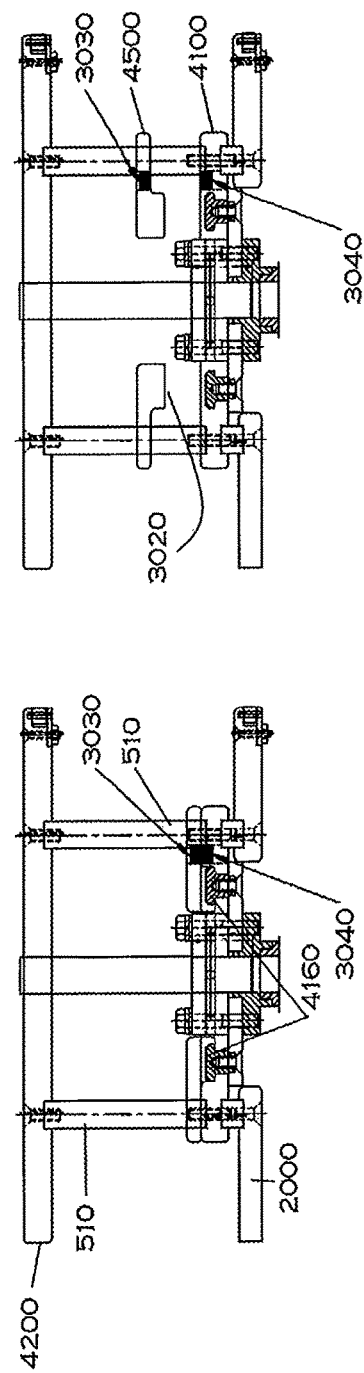
FIG 14
FIG 15

MAGNETIC FASTENING SYSTEM AND METHOD FOR CHANGE PARTS

REFERENCE TO RELATED APPLICATIONS

This application is a continuation of U.S. patent application Ser. No. 13/459,266 filed Apr. 30, 2012, which application claims benefit under 35 U.S.C. §119(e) of U.S. Provisional Application 61/480,360 filed Apr. 28, 2011, the disclosures of which are incorporated herein by reference in their entirety.

TECHNICAL FIELD

This invention relates generally to machines used in the manufacturing process to fill and cap containers. Specifically, this invention relates to a method and system for fastening change parts, rotary stars, guides, and other such interchangeable or removable components to relatively permanent portions of such filling and capper machines.

BACKGROUND ART

Filling and capper machines are well known in the industry. Exemplary machines include those described in U.S. Pat. Nos. 6,065,508 and 6,105,343, the entirety of which are incorporated herein by reference. Filling and capper machines, particularly rotary filling and capper machines, include relatively permanent portions (referred to herein generally as the core, components of the core, or portions of the core) on which interchangeable components, including change parts, rotary stars, guides, and other similar components are mounted. These interchangeable components are generically referred to herein as guides, and at times may also be referred to as interchangeable parts or interchangeable assemblies. These interchangeable components, which are well known to those skilled in the art, are generally designed to be used with containers of a particular size and shape. Because they are also designed to be attached to a generic core, they allow a filling or capper machine to be adapted to be used to fill containers having more than one size and/or shape. In order to switch a filling and capper line from use for one particular size and/or shape container, the line needs to be shut down for the time it takes to remove the interchangeable components from one or more machines, and to replace those components with interchangeable components which are customized for use with a different container size and/or shape. A similar process is involved when interchangeable components need to be replaced because they are worn, or when they need to be removed for cleaning.

Previously, these interchangeable components were typically attached to the machines using semi-permanent fasteners, such as bolts, which often require tools to unfasten. In addition to requiring tools to remove the interchangeable components, any fastener which is used in filling and capper machines may inadvertently come into contact with the material which is being introduced into the containers. Such material may be corrosive or may otherwise damage the fasteners, or make them difficult or impossible to remove. Finally, fasteners such as bolts often have relatively fine features, such as threading, which wear or otherwise become damaged over time. These factors each tend to increase the manufacturing down time because of the time it takes to switch out the interchangeable components in order to change a line from being used with one container type to being used with another, or to clean or replace an interchangeable component or worn out fasteners.

Thus, there is a need for a fastening system which can be used to easily and quickly attach interchangeable components to the relatively permanent core components of the machine, without using tools. There is also a need for a fastening system which is less likely to become permanently damaged, or frozen together, as a result of contact with the contents of the containers which are being filled, or by the wear and tear associated with swapping out components, and thus will be less likely to require maintenance.

DISCLOSURE OF EXEMPLARY EMBODIMENTS

It is an object of exemplary embodiments to provide a fastening method and system which can be used in a filling or capper machine to removably attach interchangeable components such as rotary stars, guides, and other change parts without using tools.

It is a further object of exemplary embodiments to provide a fastening method and system which can be used in a filling or capper machine to removably attach interchangeable components, such as rotary stars, guides, and other change parts, using magnets to align the parts.

It is a further object of exemplary embodiments to provide a fastening method and system which requires less maintenance and which can be used in a filling or capper machine to removably attach interchangeable components, such as rotary stars, guides, and change parts.

It is a further object of exemplary embodiments to provide a fastening method and system which is more durable and which can be used repeatedly in a filling or capper machine to removably attach interchangeable components, such as rotary stars, guides, and change parts without significant impact from wear and tear.

It is a further object of exemplary embodiments to provide a fastening method and system which can be used in a filling or capper machine to removably attach interchangeable components such as rotary stars, guides, and change parts using mating or interlocking features in conjunction with magnets to secure the interchangeable parts during the container filling or capping operation.

The foregoing objects are accomplished in an exemplary embodiment by a system which uses interchangeable components with one or more mechanically locking fasteners and one or more pairs of magnets which are out of alignment with one another when the mechanically locking fasteners are in an unlocked position and which urge the interchangeable component to move toward the mechanically locked position, thereby engaging a mechanically locking fasteners. Thus the fastening system achieves the above stated objectives, eliminates difficulties encountered in the use of prior methods, solves problems, and attains the desirable results described herein.

Further objects of exemplary embodiments will be made apparent in the following detailed description and the appended claims.

BRIEF DESCRIPTION OF DRAWINGS

FIG. 12 is a plan view of an exemplary embodiment of a multi-tiered star using a mechanical fastening device and locking pins which are urged and held in position with magnets.

FIG. 14 is a plan view from the side of the exemplary embodiment of the star shown in FIG. 12 affixed adjacent a core in an unlocked position.

FIG. 15 is a plan view from the side of the exemplary embodiment of the star shown in FIG. 12 affixed adjacent a core in a locked position.

DETAILED DESCRIPTION

Figure 1:
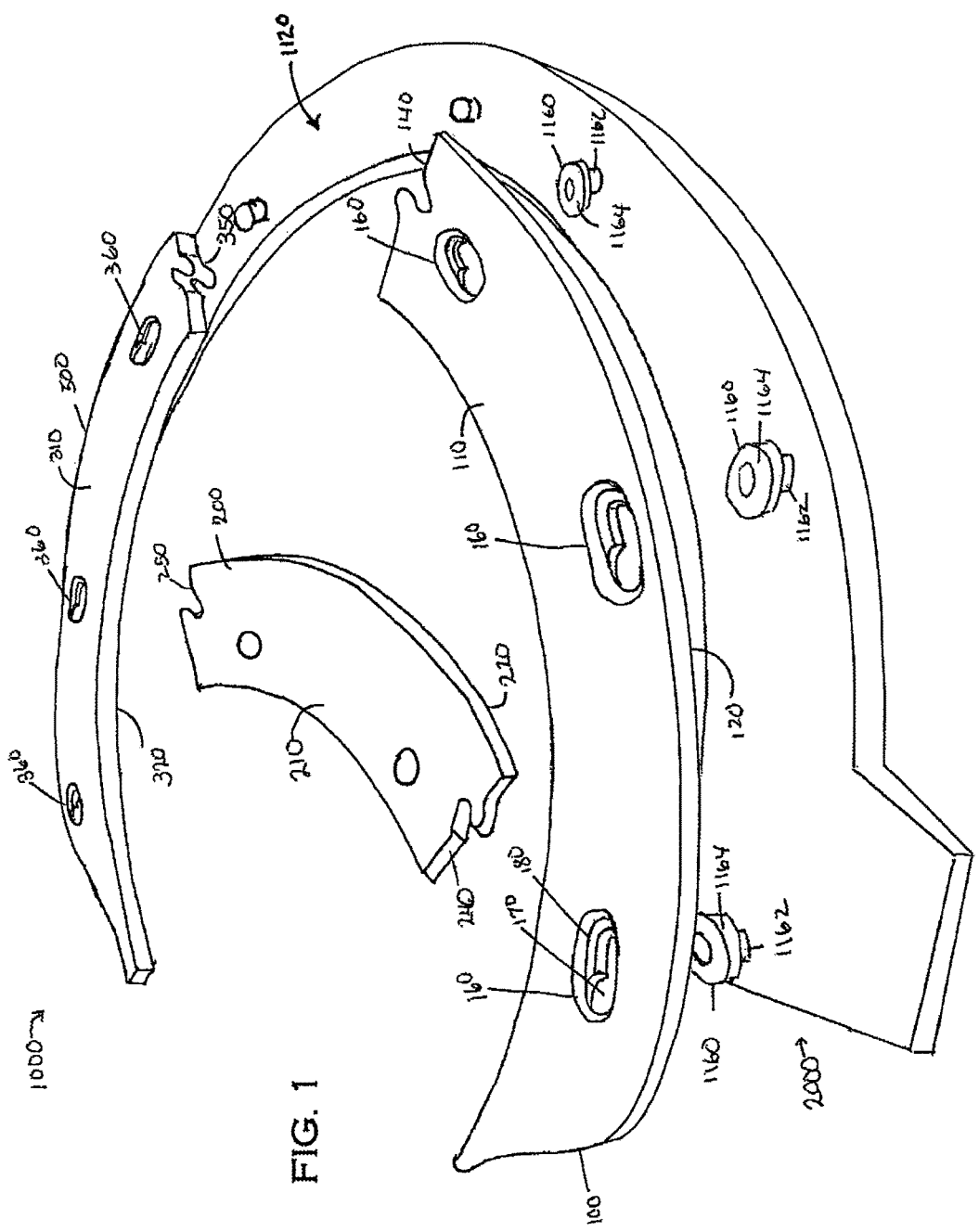
FIG. 1 is a perspective view of an exemplary embodiment of a guide assembly comprising three components, with one component attached adjacent the core of a machine.

Referring now to the drawings, and in particular to FIG. 1, shown therein is an exemplary interchangeable guide 1000 for use in a filling or capper machine. In this exemplary embodiment there are three component parts 100, 200, 300 to the guide 1000. Component parts 100, 200, 300 each comprise plates which each have a handling surface 110, 210, 310, and a fastening surface 120, 220, 320 which are generally opposed and parallel to each other. The plates comprising component parts 100, 200, 300 are typically thin relative to their length, but have sufficient thickness to withstand use in a filling or capper machine. An exemplary thickness (the average distance between the handling surface 110, 210, 310 and the fastening surface 120, 220, 320) is around an inch, but those skilled in the art will recognize that such plates may be thicker or thinner as the application requires.

Figure 3:
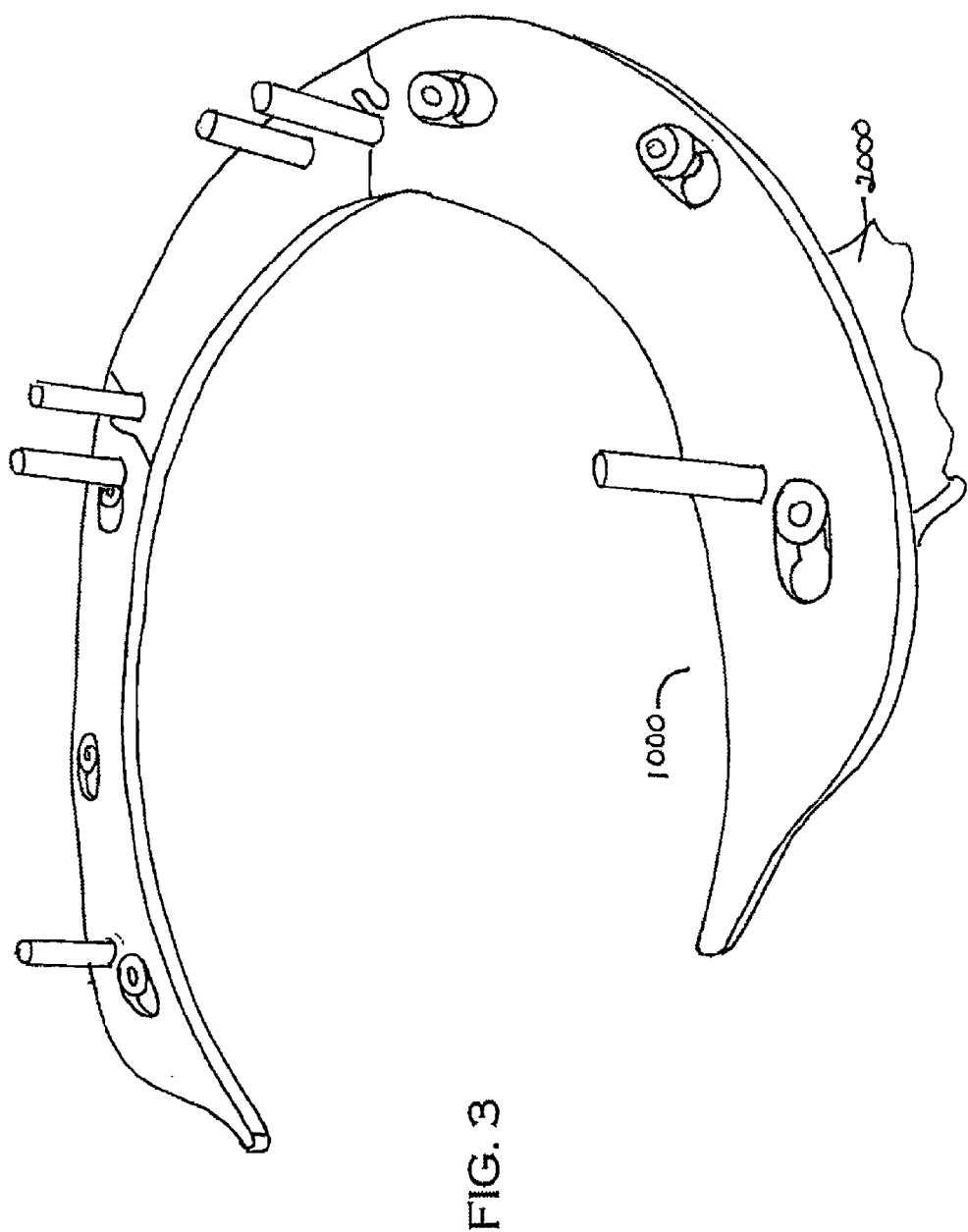
FIG. 3 is a perspective view of the exemplary guide assembly of FIG. I, attached adjacent the core of a capper machine using an exemplary embodiment of the fastening mechanism described herein.
Figure 6:
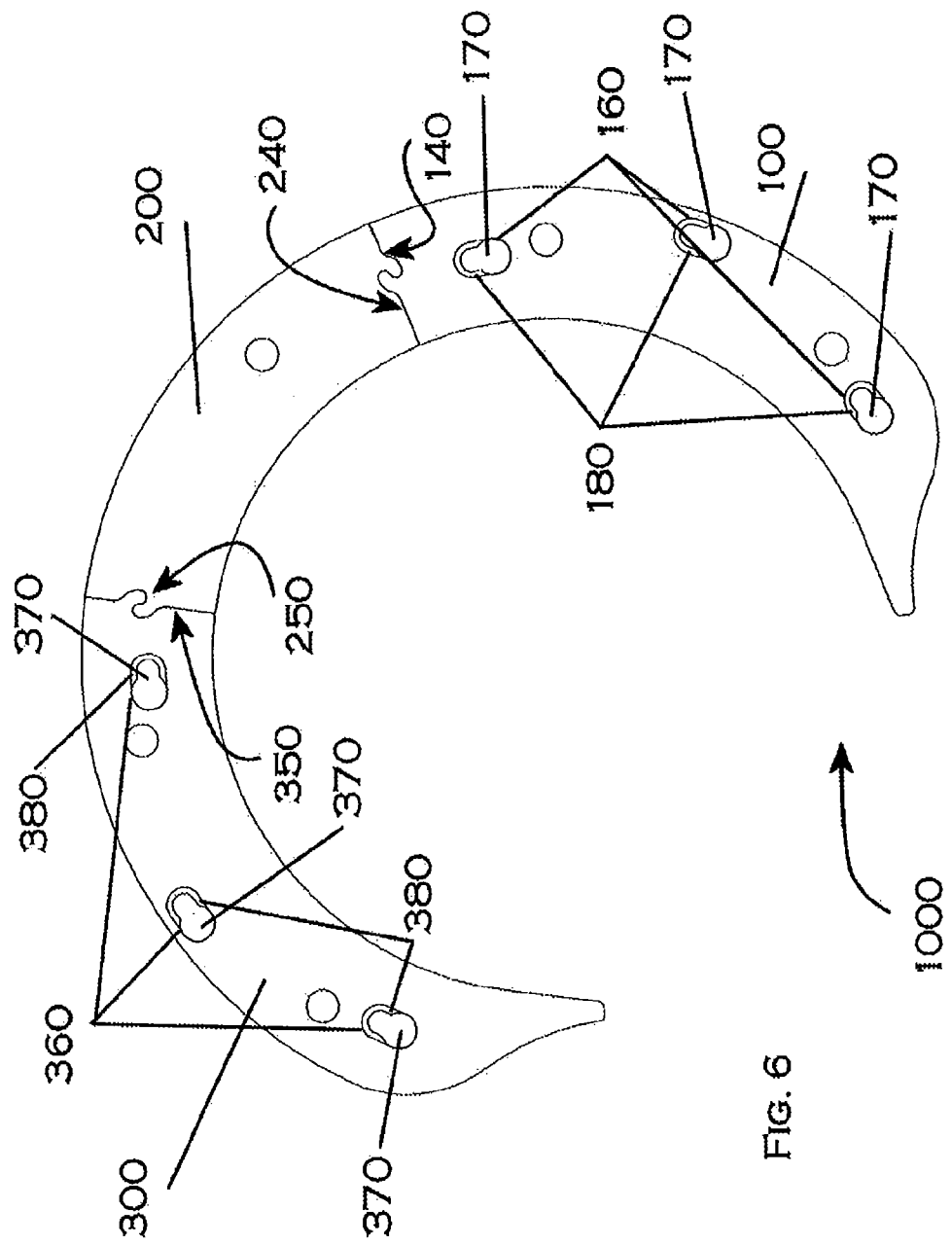
FIG. 6 is plain view of the exemplary guide assembly of FIG. 1 from the opposite surface shown in FIG. 4, the handling surface.

In addition, as most clearly seen in FIG. 6, component parts 100, 200, 300 generally have one or more puzzle type interlocking edges. In the exemplary embodiment illustrated, component part 200 has two contoured opposing surfaces which are interposed between the handling surface 210 and the fastening surface 220. These surfaces are referred to more generally as interlocking edges 240, 250 because of the short distance between the handling surface 210, and the fastening surface 220, relative to the length of the surface or, more broadly, relative to the dimensions of component part 200. In the exemplary embodiment illustrated, component part 100 has one interlocking edge 140, interposed between handling surface 110 and fastening surface 120, which has a contour which interlocks with interlocking edge 240. In the exemplary embodiment illustrated, component part 300 has one interlocking edge 350, interposed between handling surface 310 and fastening surface 320, which has a contour that interlocks with interlocking edge 250. These interlocking edges have a contour which is similar to the edges of two interlocking adjacent jigsaw puzzle pieces. The particular contour of these interlocking edges may vary considerably, but the common characteristic for the interlocking edges on adjacent parts is that in order to be separated, one or more of two interlocked adjacent parts in a plane would need to be moved, relative to the other, in a direction orthogonal to their common plane. As can be seen most clearly in FIG. 3, in the exemplary embodiment illustrated, when the interlocking edges 140, 240, 250, 350 are interlocked, component parts 100, 200, 300 form a generally U- or horseshoe-shaped guide plate 1000 which conforms, generally, to the shape of exemplary core component 2000 of the filling or capper machine.

Although the guide 1000 is horseshoe-shaped in this exemplary embodiment, other assembled guides or parts comprise different shapes to conform to a particular portion of core 2000 of a particular filling or capper machine, as well as to facilitate guiding specific sized and/or shaped containers through the filling or capping line. Additional exemplary shapes can be seen in FIGS. 11-13. Such additional shapes are well known to those skilled in the art, or will be obvious, based on the design of the cores 2000 on the machine to which they are to be attached. Similarly, although the guide 1000 in this assembly comprises three component parts 100, 200, 300, other guides may comprise fewer or more than three component parts. In addition, although the guide 1000 in this exemplary embodiment comprises a single tier, other guides may comprise a plurality of tiers which may be spaced apart using spacer posts, as will be discussed in more detail below.

Figure 4:
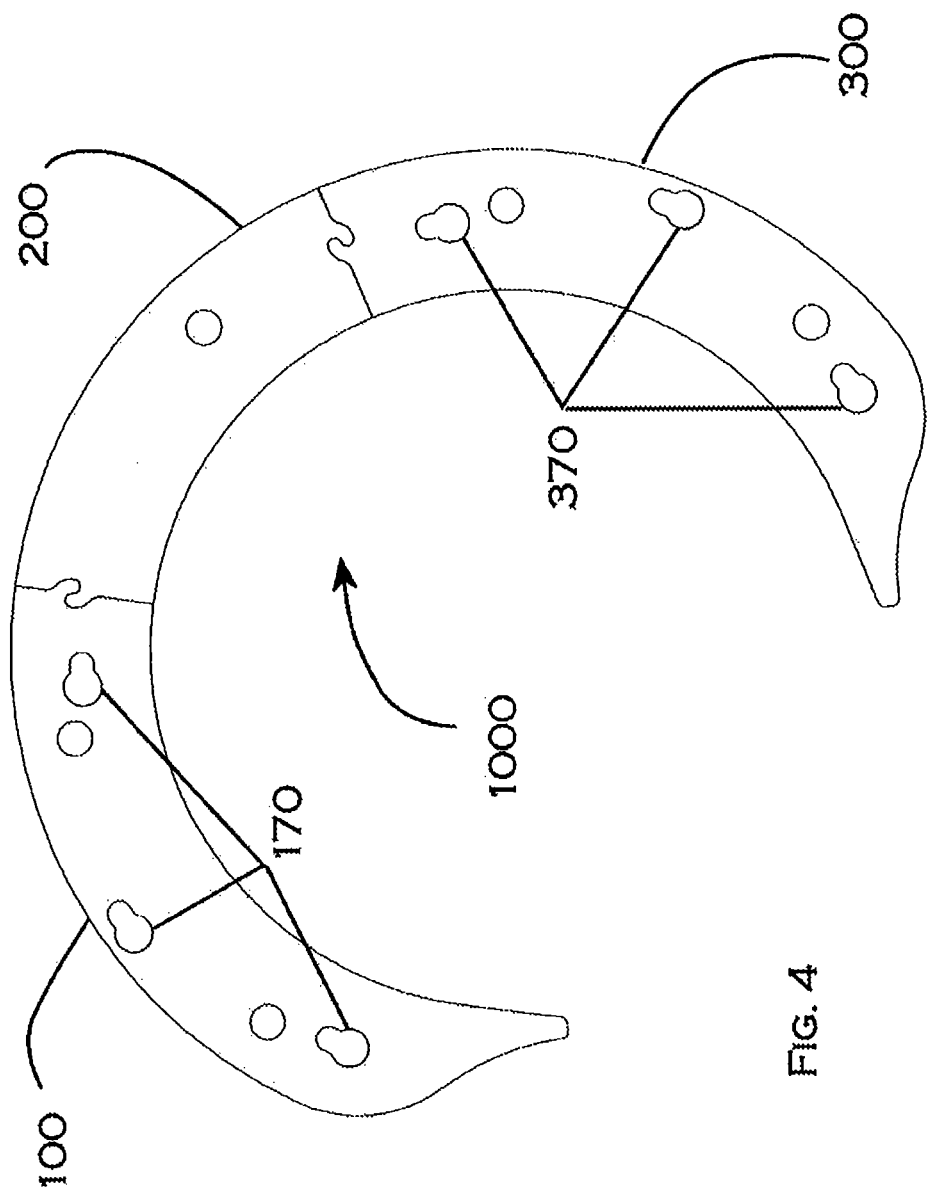
FIG. 4 is a plan view of the fastening surface of the exemplary guide assembly of FIG. I which will be attached adjacent the core of a machine.

Referring to the first exemplary guide 1000, component parts 100, 300 also include a plurality of mushroom slots 160, 360, which can be seen in FIGS. 1 and 4. Further detail of an exemplary mushroom slot 160 can be seen in FIGS. 20-22. Mushroom slots 160, 360 comprise two portions. A first portion comprises a recess 9000 in component part 100, 300, extending orthogonally into component part 100, 300 from the handling surface 110, 310. Viewed from the handling surface 110, 310, recess 9000 has a shape formed by semi-circles at each end connected by parallel segments. This recess 9000 extends into component part 100, 300 to a depth sufficient to accept mushroom heads 1164, 1364, discussed in more detail below.

A second portion of mushroom slots 160, 360 comprises a keyhole shaped passage or slot 170, 370 through component parts 100, 300. The larger end 173 of the keyhole shaped passage 170 aligns with one end of the recess 9000, and the smaller end 175 of the keyhole shaped passage is roughly equidistant from the end of recess 9000 and from the parallel sides of recess 9000. This alignment creates intermediate shelf 180,380 (labeled in FIG. 20) formed by the portion of the bottom recess 9000 surrounding the narrow end 175 of keyhole slot 170. This shelf 180, 380 is generally parallel to the handling surface 110,310 of component parts 100, 300, and extends adjacent the narrow end 175 of the keyhole shaped passage 170, 370. In the exemplary embodiment illustrated in FIG. 1, mushroom slots 160, 360 are oriented so that the narrow ends of the keyhole passages 170, 370 are closer to the interlocking edges 140, 350 of component parts 100, 300. Because component parts 100, 300 are on opposite sides of intervening component part 200, this means the mushroom slots 160, 360 are oriented so that the narrow ends 175 of the keyhole passages 170, 370, are closer to each other than the larger ends 173.

The portion of core 2000 to which interchangeable components 100, 300 are to be attached includes a plurality of mushroom pins 1160, 1360 in one-to-one relation with the mushroom slots 160, 360, which are physically aligned with the mushroom slots 160, 360 when the guide 1000 is fastened adjacent core 2000. A portion of the core can be seen in FIG. 1, and further detail of an exemplary mushroom pins 1160 can be seen in FIGS. 20-22. The head 1164, 1364 of the mushroom pins 1160, 1360 has a diameter approximately the same as the wider end 173 of the keyhole shaped passages 170, 370. The stem 1162, 1362 of the mushroom pins 1160, 1360 has a diameter approximately the same as the distance across the narrower end 175 of the keyhole passages 170, 370, and has a length which permits the head 1164, 1364 to rest on the shelf 180, 380 when the mushroom pin 1160, 1360 passes through the keyhole passage 170, 370.

Figure 20:
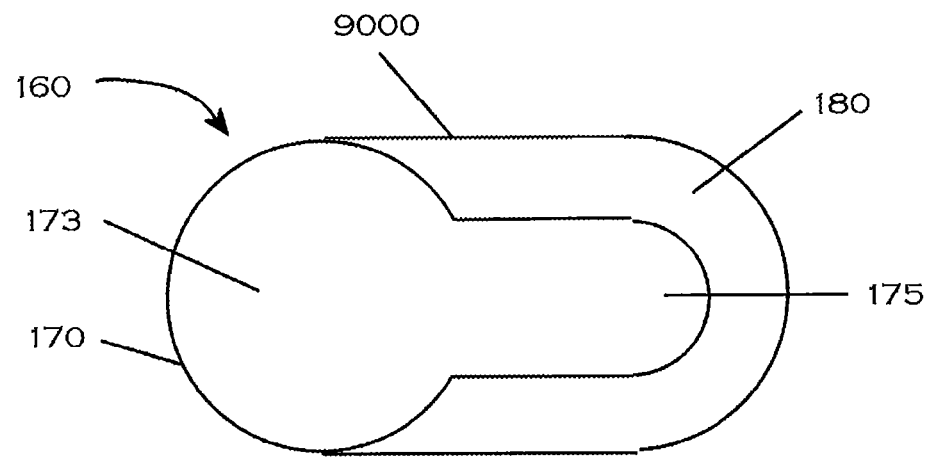
FIG. 20 is a plan view of a mushroom slot.
Figure 21:
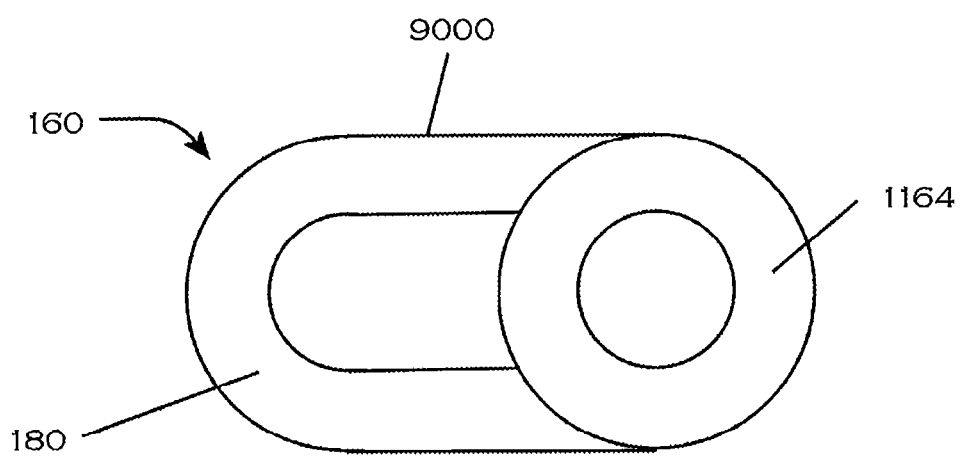
FIG. 21 is a plan view of a mushroom pin in a mushroom slot, in locked position.
Figure 22:
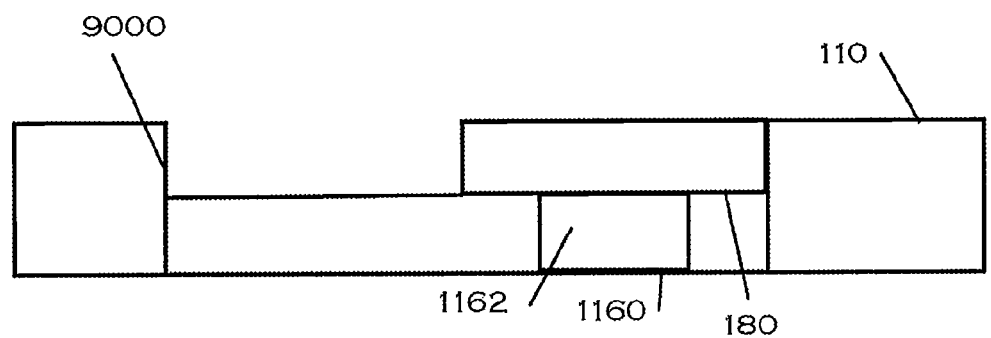
FIG. 22 is a cross-section view, orthogonal to the plane of a component part plate, of a mushroom pin in a mushroom slot in a locked position.

These mechanically interlocking features are illustrated most clearly in FIGS. 20-23, with a plan view of mushroom slot 160 in FIG. 20, a plan view of mushroom slot 160 with interlocking mushroom pin 1160 in locked position illustrated in FIG. 21, and a cross-section view of a locked mushroom slot 160 and mushroom pin 1160 illustrated in FIG. 22.

Figure 5:
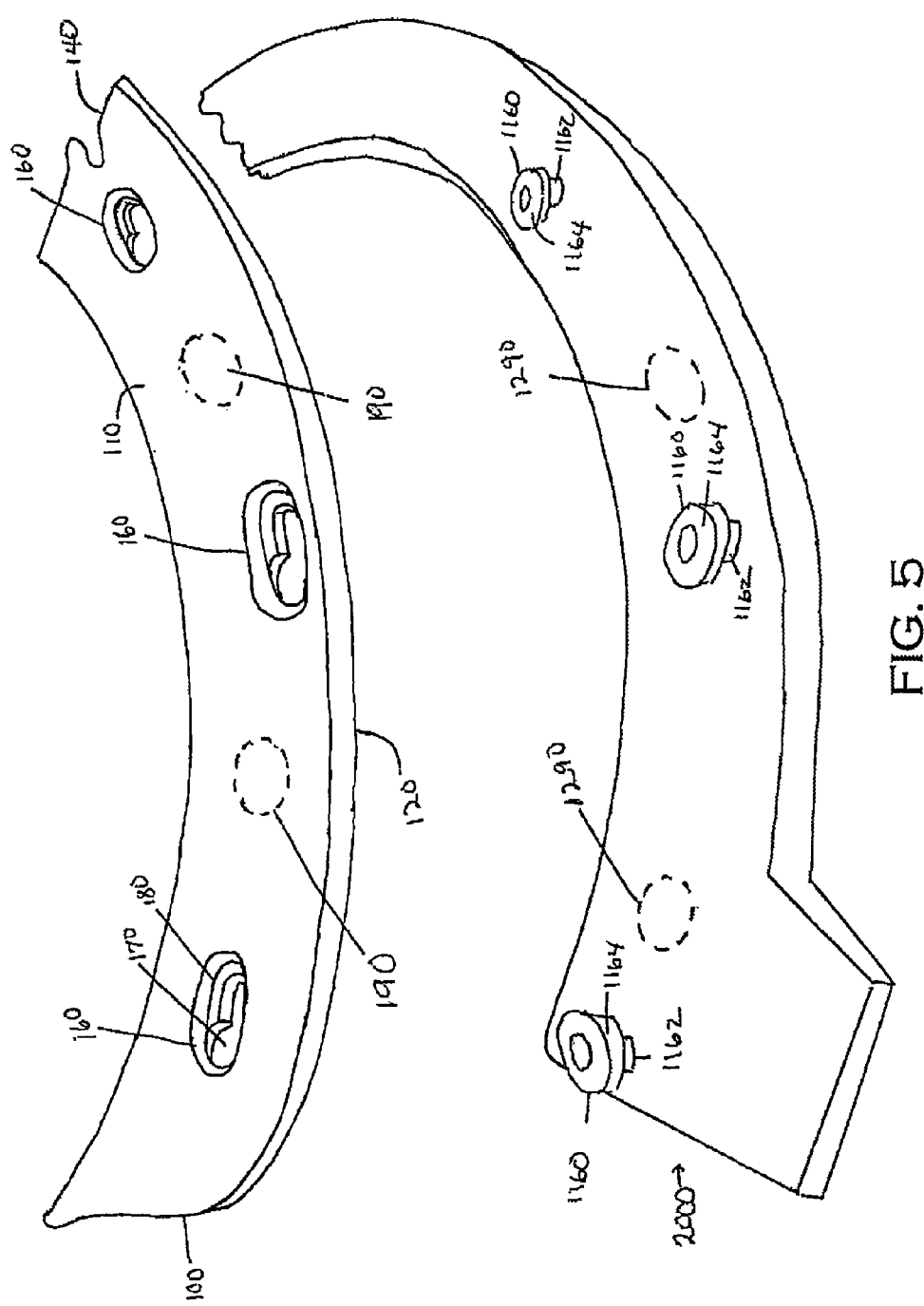
FIG. 5 is an exploded view of the first component of the exemplary guide assembly and the adjacent portion of the core of a machine including exemplary positions for biasing magnets and mushroom pins and slots.

In addition, as can be seen in phantom in FIG. 5 with respect to component 100, components 100, 300 have a plurality of magnets 190, 390 embedded adjacent their fastening surface 120, 320. Similarly, core 2000 has a plurality of magnets 1190, 1390 embedded adjacent its fastening surface 1120. Magnets 190, 390 are in generally in one-to-one correspondence with magnets 1190, 1390, and magnets 1190, 1390 are aligned with magnets 190, 390 when mushroom pins 1160, 1360 are located in the narrow, locked, end of keyhole passages 170, 370. Although it is generally the case that magnets 190 and 390 are in one-to-one correspondence with magnets 1190 and 1390, and generally the case the magnets in the interchangeable component parts of guide 1000 are similar in shape to the corresponding magnets in the core 2000, other configurations will be apparent to those skilled in the art and may include a different number of magnets in the core 2000 than in the guide 1000, or vice versa, and may include magnets that are shaped or sized differently.

The exemplary embodiment illustrated uses traditional magnets, but it will be apparent to those skilled in the art that similar non-mechanical devices may be substituted to create a bias between two parts to hold the parts together or to move them relative to each other, or electromagnets which may be turned off to make releasing the component parts easier may be substituted. Similarly, the exemplary embodiment illustrated and discussed in detail herein uses mushroom pins and mushroom slots to provide the mechanically interlocking fastener to attach a guide 1000 to a core component 2000. Those skilled in the art may substitute other similar mechanically interlocking fasteners which are characterized by being able to be to be interlocked by being slid or rotated into locked position.

Figure 2:
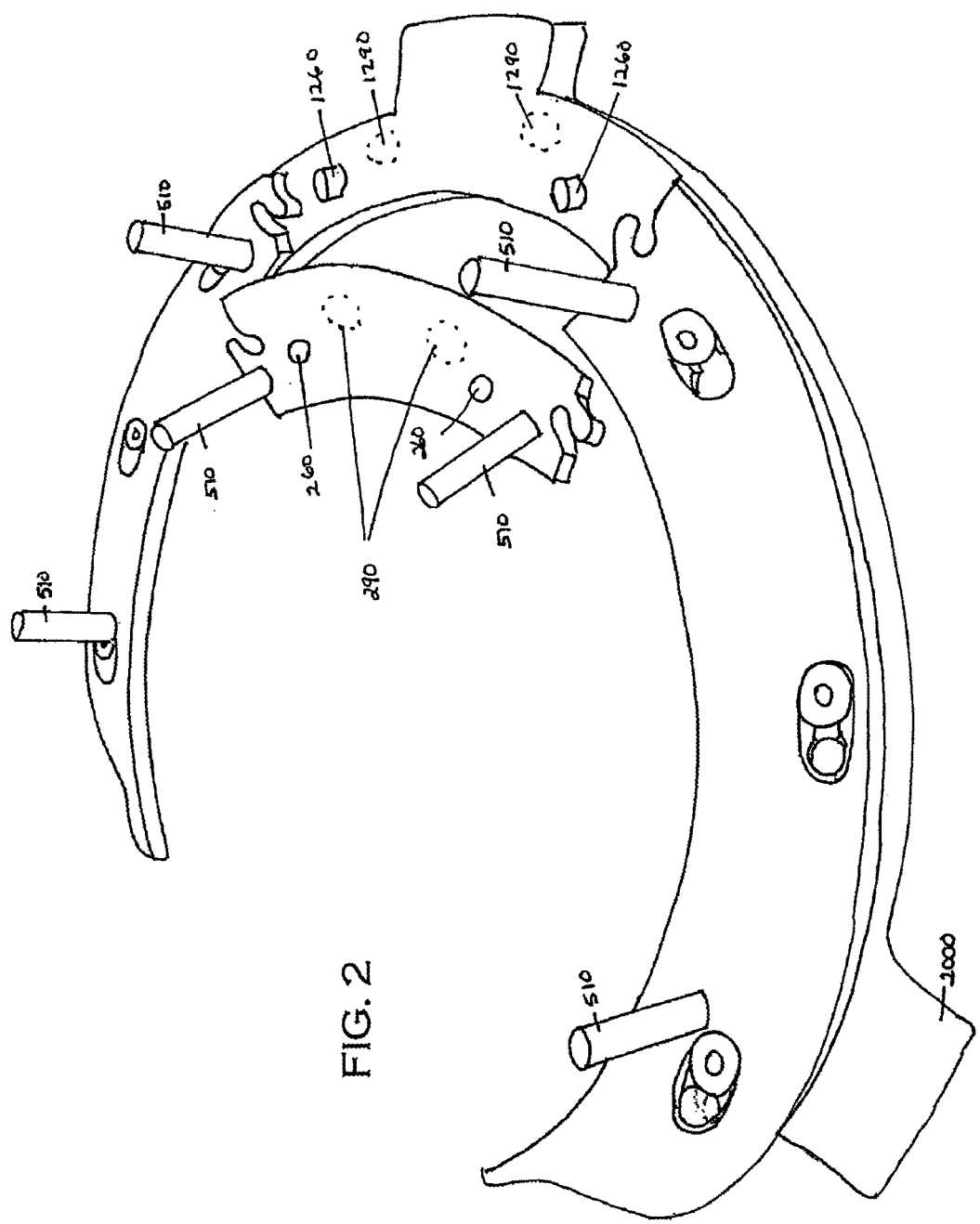
FIG. 2 is a perspective view of the exemplary guide assembly of FIG. 1, with two components attached adjacent the core of a machine.

As can be seen in FIG. 2, component part 200 has a plurality of holes 260 passing through it, which are aligned with a plurality of pegs 1260 attached to the fastening surface of core 2000. In addition, component part 200 may have magnets 290 embedded adjacent its fastening surface 220. Core 2000 similarly may include a plurality of magnets 1290 which are embedded adjacent its fastening surface in one-to-one correspondence with the plurality of magnets 290 in component part 200. Magnets 290 and 1290 are shown in phantom in FIG. 2. In the exemplary embodiment illustrated, holes 260 pass through component part 200, but there may be circumstances in which it is useful to have a solid surface 210, in which case holes 260 may be recesses extending orthogonally into component part 200 from fastening surface 220, with or without passing completely through, creating holes/recesses 260 in fastening surface 220 which are adapted to accept shorter pegs 1260.

Another exemplary embodiment of an interchangeable guide using the same principles discussed above is illustrated in FIGS. 13 and 16. Exemplary guide 7000 is a two tier guide, with a first tier illustrated in FIG. 13, and a second tier illustrated in FIG. 16. Both tiers are plates with a shape, viewed from above, roughly like a bulky X, with major arcs of circles comprising the external contours of the left, top, and right sides (as oriented in the illustration in FIGS. 13 and 16).

Figure 13:
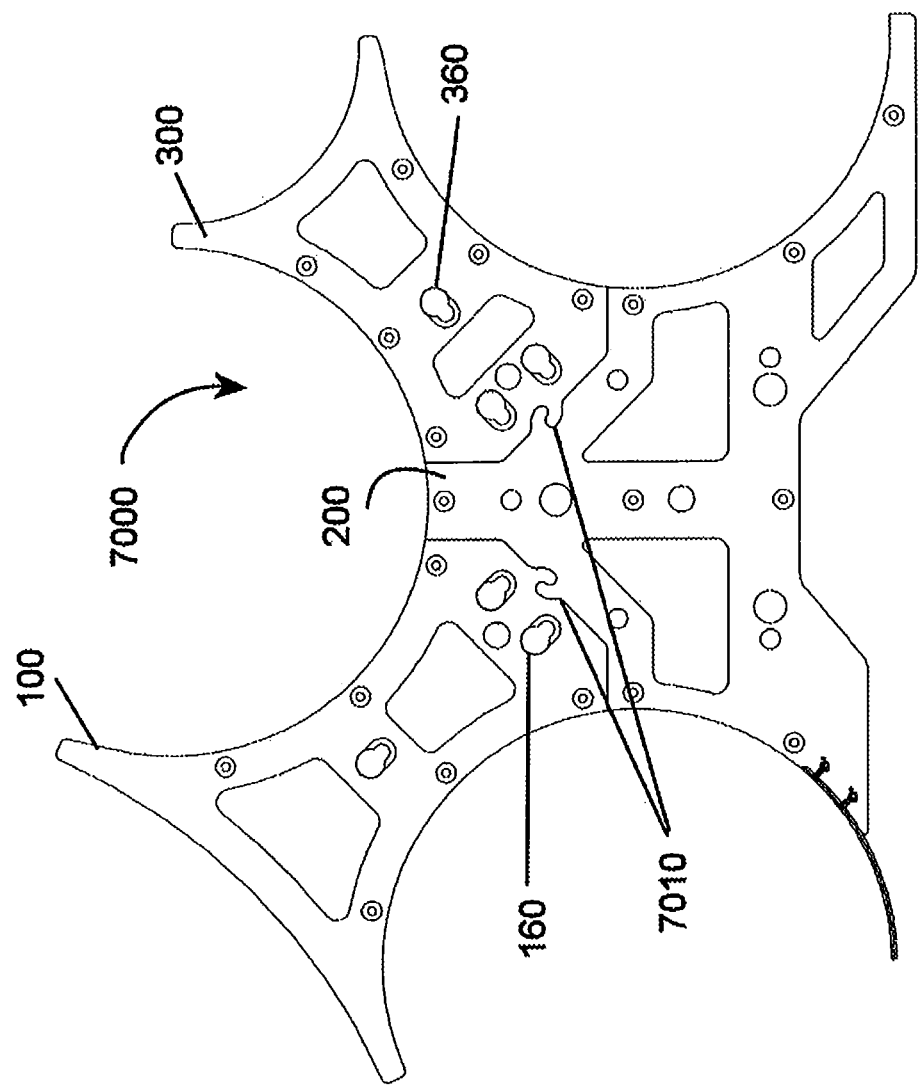
FIG. 13 is a plan view of the first tier of an exemplary embodiment of a center guide.

Similar reference numbers to those used in guide 1000 denote functionally similar features, and to provide a clearer view of the features, not all of the features discussed are labeled with reference numerals. Turning to FIG. 13, the first tier of guide 7000 comprises component parts 100, 200, 300. Parts 100, 300 each include a plurality of mushroom slots 160, 360 in one to one correspondence to mushroom pins 1160, 1360 on the core component 2000 (not shown) to which the first tier of guide 7000 is to be attached. Parts 100, 300 each have an interlocking edge 140, 350 (not labeled). Mushroom slots 160, 360 are oriented with the narrow end 175 (not labeled) orthogonal to at least a portion of interlocking edge 140, 350. Part 200 includes a portion which extends between parts 100, 300, and includes two interlocking edges 240, 250 (not labeled), which mate with interlocking edges 140, 350 to form mechanical locks 7010.

Parts 100, 300 further include a plurality of magnets in one-to-one correspondence with magnets in core component 2000 to which they are to be attached. The magnets in parts 100, 300 are offset from the magnets in core component 2000 in a direction, and at distance, to bias component 100 to move up-left (in the orientation illustrated in FIG. 13) and component 300 to move up-right (in the orientation illustrated in FIG. 13, so that mushroom pins 1360 move into locking engagement with mushroom slots 360.

The exemplary second tier of guide 7000 is illustrated in FIG. 15. The second tier of guide 7000 is similar to the first tier, with the exception that it does not include mushroom slots. In each component 100, 200, 300, the tiers are held apart in a fixed relation parallel to each other by a plurality of spacer bars 510, in a manner well known to those skilled in the art.

More generally, with respect to tiers, depending on the size and shape of the containers being filled or capped, the guides, stars, or other change parts may require multiple tiers in order to stabilize the containers. The additional tiers may be roughly parallel with, the first tier 1001 and spaced apart from the first tier 1001 by spacer posts 510. The first tier 1001 may have the features and characteristics of guide 1000, described above. Each tier 1001, 1002, . . . , 100n, of the guide or other change part may include component parts which correspond to parts 100, 200, 300 and which have interlocking edges similar to those in guide 1000. Spacer tiers 510 are well known in the art, and in the exemplary embodiments discussed herein, generally comprise a plurality of rods to which the plates comprising tiers 1001-100n are attached in order to hold such tiers in fixed relation, parallel to one another. These general principles will be discussed in more detail, as applicable to specific exemplary embodiments below.

Figure 18:
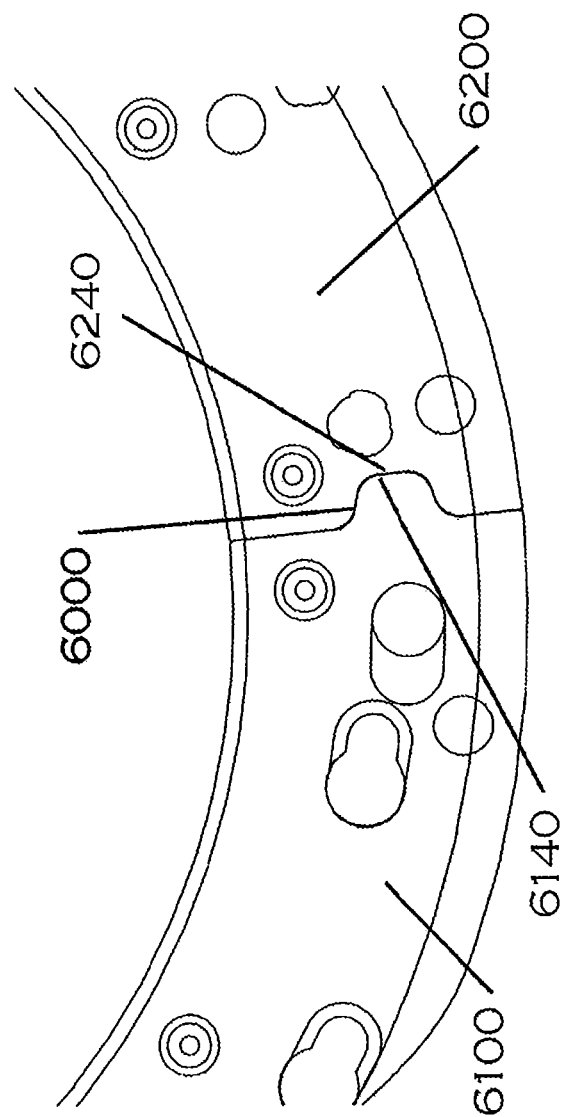
FIG. 18 is a plan view of a portion of a guide which includes a taper lock.

In some embodiments one or more tiers of a multiple tiered guides may have simple taper locks 6000. Taper locks 6000 have conforming but not interlocking edges, as may be seen in FIG. 18. As illustrated in FIG. 18, the contour of edge 6140 is convex, in the shape of a tab, and the contour of edge 6240 is concave, generally conforming to the shape of edge 6140. The contour of taper locks 6000 may vary, but a characteristic which distinguishes taper locks from an interlocking lock is that component parts 6100, 6200 may be easily separated by moving component parts 6100, 6200 away from each other in their shared plane.

Figure 19:
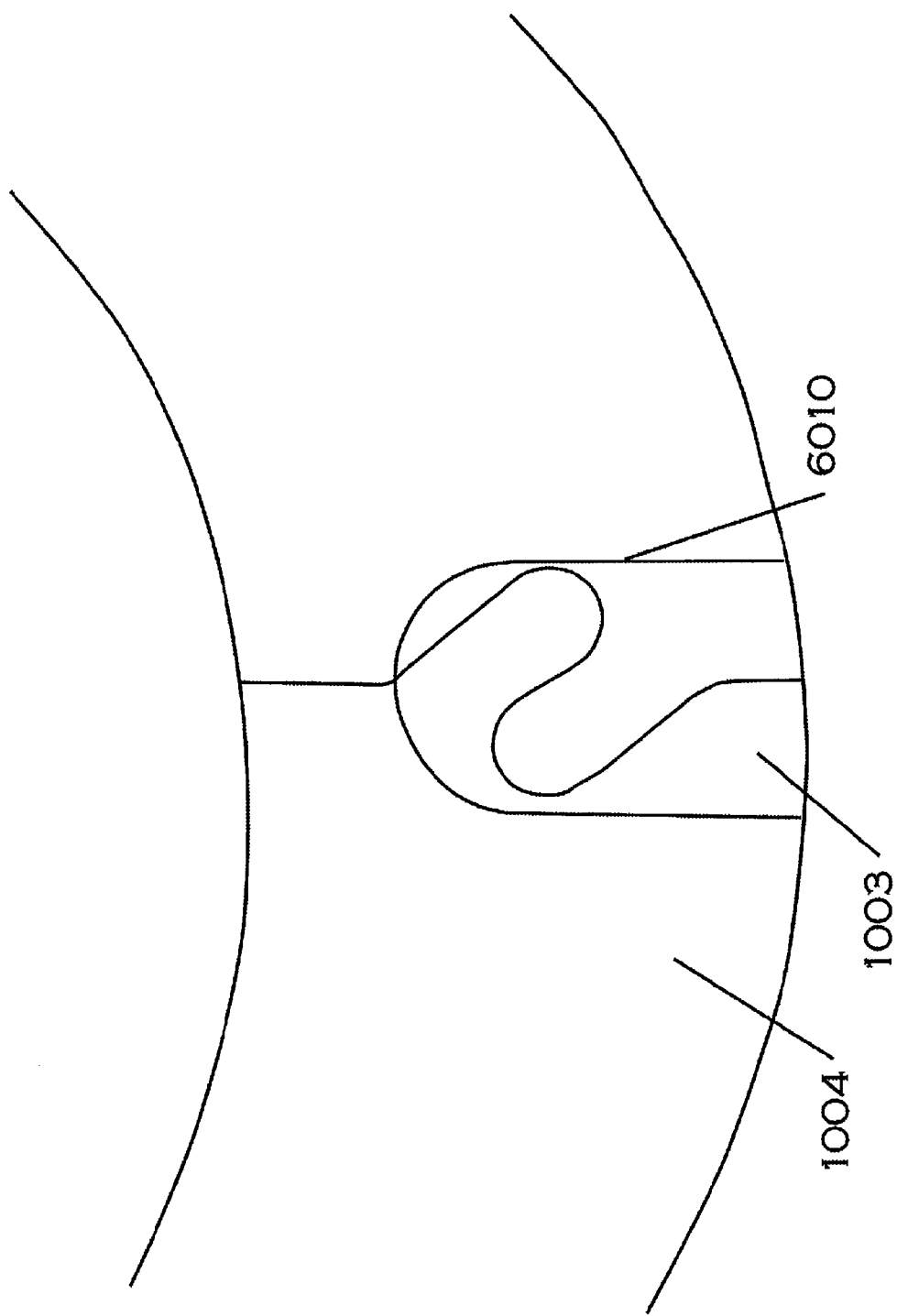
FIG. 19 is a plan view of two tiers including a puzzle type connection on one tier and a cutaway portion of a second tier.

Some multi-tiered embodiments may contain closely spaced tiers making large scale movement of such interchangeable components, to attach or detach such components from the core, difficult. These embodiments may require features which are adapted to accommodate limited range of motion in the direction perpendicular to the plane of tiers 1001, . . . , 100n. An exemplary embodiment of upper tiers 1003, 1004, which are designed to accommodate such restricted movement, is shown in plain view in FIG. 19. The exemplary embodiments illustrated in FIG. 19 includes interlocking edges 140, 240, and a V-shaped carve-out 6010 in the upper tier 1004 of two closely spaced tiers 1003, 1004, with the open end of the V extending to one edge of tier 1004. Carve-out 60 10 in upper tier 1004 is formed by edges 6140, 6240 of component part 100 of tier 1004 which curve away from, rather than conform to each other when assembled adjacent each other. Tiered component 100, with an interlocking edge 140 in tier 1003, also includes a carve-out edge 6140 in tier 1004. In order to attach or remove component 100, component 100 may be moved orthogonally with respect to the planes of the tiers. For the removal of component 100, it would be moved away from core 2000, disengaging interlocking edge 140 from interlocking edge 240 in tiered component 200. This moves interlocking edge 140 into the carve-out 6010 in tier 1004, permitting tiered component part 100 to be slid, parallel to the planes of tiers, in the direction of the open end of V-shaped carve-out 6010 to remove component part 100. The steps are reversed in order to attach component 100.

Although using a cut-away part to accommodate tight clearances is discussed in connection with the 3rd and 4th tiers, these tiers are exemplary only, and the features discussed herein may be used in any two closely spaced tiers.

Generally, in a multi-tiered interchangeable component at least the top tier will include puzzle-type interlocking edges, in order to provide stability to the guide as containers move through the filler or capper. Tiers closer to the core 2000 may also include interlocking edges to provide greater stability, or may use taper locks or clearance openings as appropriate to provide a stable filling environment and easy assembly, disassembly, and access to the core.

Figure 11:
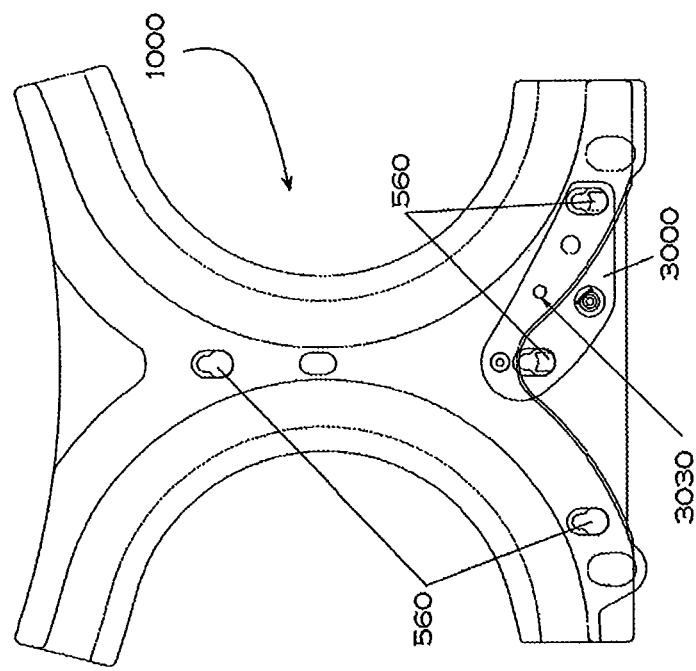
FIG. 11 is a plan view of an exemplary embodiment of a center guide using mechanical fastening devices and locking protrusions which are urged and held in position with magnets.
Figure 10:
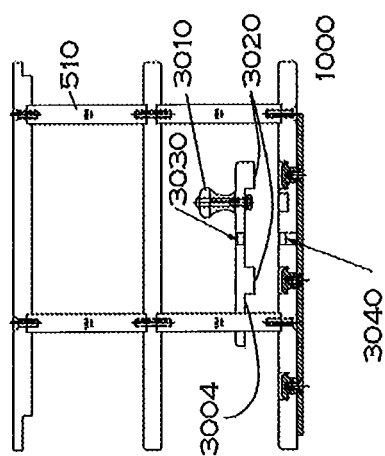
FIG. 10 is a cross-section view of a three tiered guide in an unlocked position.
Figure 9:
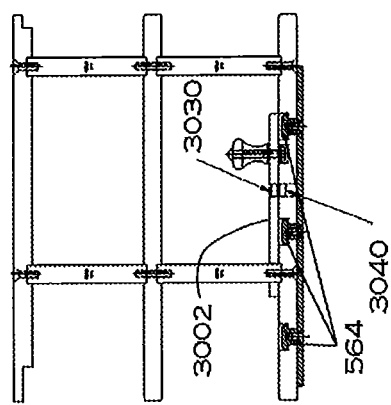
FIG. 9 is a cross-section view of a three tiered guide in locked position.

A further exemplary embodiment of a fastening mechanism employing similar principles to those described above is illustrated in FIGS. 9-11. In this exemplary three tiered embodiment, the shape of center guide 1000 viewed from above resembles two back to back Cs, or a curvy X. Rather than being comprised of a plurality of interlocking components, exemplary guide 1000 is a single unitary plate. Rather than an intermediate component 200 providing a physical barrier to prevent components 100, 300 from moving toward each other and the mushroom pins and mushroom slots being inadvertently unlocked, exemplary guide 1000 uses a locking plate which inserts physical barriers directly into mushroom slots 560 to prevent the mushroom pins 564 from inadvertently being released. Exemplary guide 1000 contains a plurality of mushroom slots 560. Guide 1000 is adapted to be attached adjacent core component 2000. Core component 2000 includes a plurality of mushroom pins 564 which extend upward, as illustrated in FIGS. 9-11, from the core 2000, aligned with and in one-to-one correspondence to mushroom slots 560 in exemplary guide 1000. The mushroom slots 560 in this exemplary embodiment, are aligned parallel to each other, and oriented with the narrow end 175 of the keyhole slot 170 in the same position relative to every other keyhole slot 170. The guide 1000 is slid into position on the core 2000 using the mushroom pins 564 and mushroom slots 560. This locked position can be seen from the side in FIG. 9. Typically, the guide 1000 will be placed on the core slightly out of alignment (upward, relative to the FIG. 11 illustration), and moved into alignment (downward, relative to the FIG. 11 illustration) to lock mushroom pins 564 into the mushroom slots 560. This process of aligning the guide 1000 may be assisted by means of offset embedded magnets, in the same manner as magnets are used to urge components 100 and 300 into engagement with core 2000, by biasing the guide 1000 to move along core 2000 toward the locked position.

This exemplary embodiment further includes a locking plate 3000. In this exemplary embodiment, the locking plate 3000 is an elongated plate having parallel and opposed handling surfaces 3002, and fastening surface 3004. Handling surface 3002 may include a knob handle 3010. The locking plate 3000 has locking protrusions 3020 extending orthogonally outward from a fastening surface 3004. Protrusions 3020 have a cross-section which is similar in size and shape to the recesses 3050 which are created above the shelves 180, 380 between the walls of the recess 9000 and the heads of the mushroom pins 1160, 1360 when the guide 3000 is in locked in place.

Figure 17:
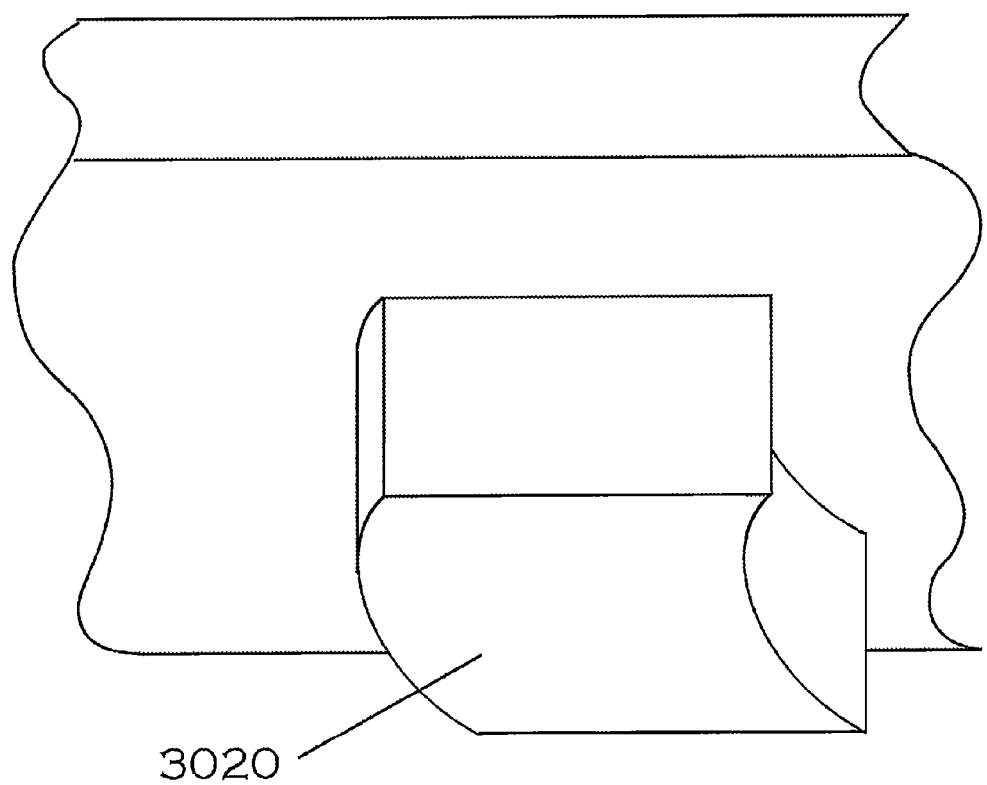
FIG. 17 is a perspective view of exemplary protrusions which may be used to lock mushroom pins in mushroom slots.
Figure 23:
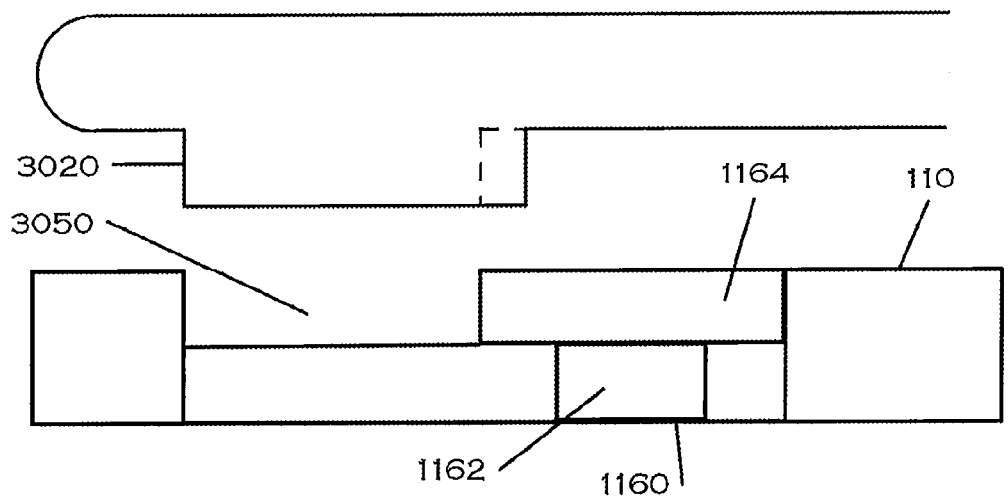
FIG. 23 is a cross-section view, orthogonal to the plane of a component part, of a mushroom pin in a mushroom slot in a locked position, with a locking protrusion positioned directly above the recession into which it fits when used to lock the mushroom pin in the mushroom slot.

An exemplary locking protrusion 3020 is illustrated in perspective view in FIG. 17, and a cross-section view of an exemplary embodiment of mushroom slot 160, mushroom pin 1160, and locking protrusion 3020 positioned above the recess 3050 into which it fits is illustrated in FIG. 23. It should be noted that the contour of locking protrusion 3020 adjacent the head 1164 of mushroom pin 1160 is concave in order to accept the convex contour of the head 1164 of mushroom pin 1160. The innermost, central, portion of locking protrusion 3020 is shown in phantom in FIG. 23. The cross-section of the protrusion 3020, and its relation to the mushroom slot 160 and pin 1160 may also be seen in FIG. 12, the plan view of a star. Generally, the cross-section comprises parallel, spaced apart, minor arcs of a circles with a diameters approximately that of the head of the mushroom pin 564. The endpoints of each arc are connected to the endpoints of the other arc by parallel segments. This cross-section is only exemplary, and other appropriate cross-sections will be apparent to those skilled in the art which, when extended out as a solid from the fastening surface of the locking plate, may provide a physical barrier to prevent the head of mushroom pin 564 from moving toward the opposite end of recess 9000 (as can be seen in FIGS. 21 and 22).

As illustrated in FIG. 12, in each of the mushroom slots 4150 the portion of the recess 3050 into which protrusion 3020 fits is shown in phantom. In the exemplary embodiment illustrated, there is a gap around the linear sides of the cross-section of protrusion 3020. In other embodiments, depending on the shape of protrusion 3020, protrusion 3020 may fill all or nearly all of recess 3050. For purposes of providing a mechanical barrier the length of protrusion 3020, in a direction parallel to the linear portions of the cross-section described, should be approximately the same as the distance between the mushroom pin 564 and the opposite end (in locked position) of recess 9000.

Returning to FIG. 11, the exemplary locking plate 3000 is magnetically biased toward the lower tier of guide 1000 by magnets 3040 in the handling surface of the lowest tier of the guide 1000 and magnets 3030 in the fastening surface of locking plate 3000. The magnetic force holds the locking protrusions 3020 in the mating recesses 3050 in the mushroom slots 560, preventing the mushroom pins 564 from sliding out of engagement. Locking plate 3000 may be slidingly attached with spacer posts 510 to constrain the motion of locking plate 3000 to the vertical direction (as illustrated in FIGS. 9 and 10), or to rotation about spacer post 510.

FIGS. 12 and 14-15 illustrate an exemplary embodiment of a two tiered star 4000 with four arms with a generally circular locking plate 4500. The four armed star described herein is exemplary. The number of arms in a star depends on the size of the filling or capper machine, and the size of the containers the star is adapted to move through the line. As illustrated in FIGS. 12, and 14-15, the exemplary embodiment of star guide 4000 comprises two tiers 4100 and 4200. The lower tier 4100, when assembled, comprises plate 4105, generally in the shape of a truncated four armed star comprising two abutting halves 4101 and 4102, with a plurality of arms 4103. Abutting halves 4101 and 4102 each have handling and fastening surfaces corresponding to those of interlocking components 100, 200, 300 described previously. The star plate 4105 includes a plurality of mushroom slots 4150 which align with a plurality of mushroom pins 4160 affixed to a portion of core 2000. Mushroom slots 4150 are typically oriented tangential to a circle which is concentric with the center of star plate 4105. The upper tier 4200, when assembled, comprises a plate 4300, generally in the shape of a four armed star, having a plurality of arms 4305 which are longer than those in the lower tier 4100. In this exemplary embodiment, upper tier 4200 comprises two interlocking halves 4301, 4302. Interlocking halves 4301 and 4302 each have handling and fastening surfaces which correspond to those described with respect to interlocking components 100, 200, 300. Interlocking halves 4301 and 4302 include interlocking edges 4311, 4312, which are interposed between and are perpendicular to the handling and fastening surfaces, and which interlock in the same manner as surfaces 140, 240 and 250, 350 in the embodiment illustrated in FIG. 1. First tier 4100 and second tier 4200 are spaced apart using spacer posts 510, in a manner well known to those skilled in the art.

Figure 24:
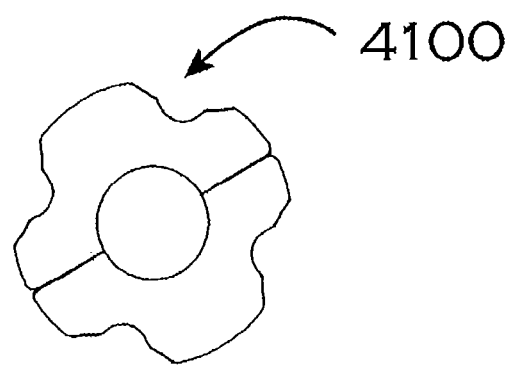
FIG. 24 is a plan view of a lower tier of a star.
Figure 25:
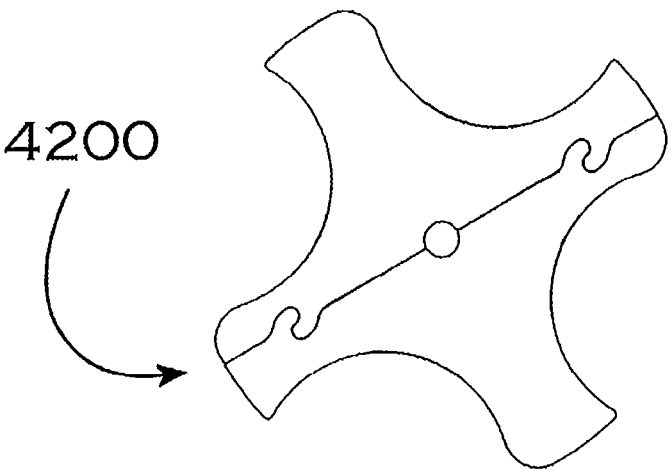
FIG. 25 is a plan view of an upper tier of a star.

For clarity, the general shapes of the exemplary embodiments described above for first and second tiers 4100, 4200 are shown in plain view, without reference numerals associated with feature details, in FIGS. 24-25. As noted above, the specific shapes for a star may vary considerably to accommodate filling or capper lines which have different central rotary sizes, or to accommodate using the filling or capper device with different sized or shaped containers. These variations may include arm length, number of arms, shape of the sockets created between arms, distance between tiers, number of tiers, and other variations that will be apparent to those skilled in the art.

Star 4000 may be placed on core 2000 slightly out of rotational alignment, and may be rotated so the mushroom pins 4160 and mushroom slots 4150 interlock. The lowest tier of star 4000 and core 2000 may include magnets embedded in the adjacent fastening surfaces of core 2000 and first tier 4100 which are out of alignment when the mushroom slots 4150 of star 4000 is initially placed over the mushroom pins 4160 on core 2000. Because these out of alignment magnets are biased to align themselves, they serve to rotate star 4000 into locked position on core 2000.

As can be seen most clearly in FIGS. 14-15, star 4000 further includes one or more locking plates 4500 which function similarly to plate 3000 in FIG. 13. In this exemplary embodiment, the locking plate 4500 comprises two plates which abut to form a truncated star with a shape, in plain view, which is similar to that of the star in tier 4100, and which is open at the center and concentric with the center of tier 4100. Locking plate 4500 includes fastening 3004 and handling 3002 surfaces, and may be constrained to move only vertically (in the orientation shown in FIGS. 14 & 13) by a sliding attachment with spacer posts 510. Locking plate 4500 has protrusions 3020 extending orthogonally from a fastening surface 3004. Protrusions 3020 have a size and shape, and are aligned, to mate with the recesses 3050 which are created when mushroom pins 4160 rotate into position in mushroom slots 4150. As illustrated in FIG. 12, as viewed from above, the head of mushroom pin 4160, when aligned, is in the counterclockwise portion of the mushroom slot 4150, and protrusion 3020 is inserted in the clockwise portion as a block to prevent the mushroom pin 4160 from rotating back out of the mushroom slot 4150. In the exemplary embodiment illustrated, the fastening surface of plates 4500 and handling surface of first tier 4100 contain magnets 3030, 3040 which urge and hold the protrusions 3020 into recesses 3050. FIG. 14 shows, in cross-section, an exemplary star in unlocked position, and FIG. 15 shows an exemplary star in locked position.

When a filling and capping line is being set up for use, appropriate interchangeable guides, stars, and other change parts are selected which conform to various relatively permanent portions of the filling and capper machines and system. These interchangeable parts are designed to provide temporary single or multi-tiered guides which are adapted to move and stabilize the containers that are being filled and capped as they pass through the line. Those guides are then affixed to the semi-permanent parts of the filling, capper, or other device (generically referred to as the core, or portions of the core, or components of the core) so that the general purpose filling or capping apparatus can safely and efficiently be used to fill and cap the particular containers which are intended to be filled.

The following is a general description of the way in which the interchangeable parts described above may be attached to a machine which is part of a commercial line for filling and capping containers. First the operator must identify at least one semi-permanent core component of the machine to which the interchangeable parts will be attached. The core component will have a generally planar surface with a plurality of mushroom pins extending upward from the surface. At least one interchangeable part will be selected. The interchangeable part may include biasing magnets and mushroom slots, in one-to-one correspondence with the plurality of mushroom pins in the core component. A locking component will also be selected. The locking component may include at least one portion which prevents the mushroom pins from moving within the mushroom slots, and may also include at least one magnet which is biased to keep the locking component in the locking position. The interchangeable part will be placed in connection with the core component, generally with the interchangeable part on top of the core component with the mushroom pins from the core component extending through the mushroom slots in the interchangeable part without sliding the interchangeable part into locked position. The magnets in the core component and in the interchangeable part component, in this position, will be out of alignment with each other and the bias created by offset magnets will move the interchangeable part so that the mushroom pins and the mushroom slots are pulled into engagement with each other. Some interchangeable components are made of a single part, and others may comprise more than one part. If more than more than one similar part is required, the additional parts will also be selected, placed, and pulled into position. Once these parts are in position, the locking component will be put in position. The locking component comprises one of two general embodiments: (1) a plate with protrusions which are inserted into recesses within the mushroom slots with the plate held in position by magnets or (2) a plate which is placed between and which interlocks along its edges with other interchangeable components to keep those interchangeable components separated and which locking component is held in position by a combination of magnets and/or pegs. This locking component is placed into position, preventing the mushroom pins from moving out of locking engagement with the mushroom slots either by directly keeping the mushroom pin from moving within the slot, or by preventing movement of the interchangeable component parts.

Using the guide 1000 as an example, component part 100 of guide 1000 is grasped from the handling side, using pegs (not shown) or spacer posts 510, which may be provided to space tiers apart or make handling easier. The larger ends 173 of keyhole passages 170 in component 100 are aligned with the mushroom pins 1160, and component part 100 is moved toward core 2000. As the keyhole passages 170 slide over the heads of mushroom pins 1160, magnets 190 are in close enough in proximity to magnets 1190 that the attractive forces of the out of alignment magnets 190, 1190 draw them into alignment with each other, urging component 100 to rotate away from the center of the horseshoe-shaped portion of core 2000 resulting in the mushroom pins 1160 and slots 160 rotating into the locked position.

Component part 300 of guide 1000 is similarly placed into position in relation to the other end of core 2000, with magnets 190, 1190 pulling into alignment with each other, urging component 300 to rotate away from the center of the horseshoe resulting in mushroom pins 1360 and slots 360 being rotated into attached position.

Component part 200 is then moved, orthogonally toward core 2000, into position between component parts 100 and 300. Pegs 1260 which serve as protrusions from core 2000 are inserted into recesses 260, and edges 140, 240 and 250, 350 are interlocked like puzzle pieces. In some embodiments, magnets are embedded in component part 200 to assist in pulling it toward aligned magnets embedded in core 2000.

The multi-part guide 1000 is thus fixed in position by plurality of mechanisms: (1) the magnets which urge component parts 100, 300 away from component part 200, (2) the mechanical barrier of component part 200 between component 100 and component part 300, which prevents movement of 100 and component part 300 toward each other in the plane of plate 1000 (3) the mechanical lock created by mushroom pins 1160, 1360 and mushroom slots 160, 360, (4) the mechanical lock created by the interlocking edges between the component parts 100, 200 and 200, 300 which further constrain the motion of parts 100, 200, 300 within the plane of multi-part guide 1000, (5) pegs and holes which constrain the motion of part 200 within the plane, and (6) magnets which bias part 200 to remain in the plane of plates 100, 300.

Figure 16:
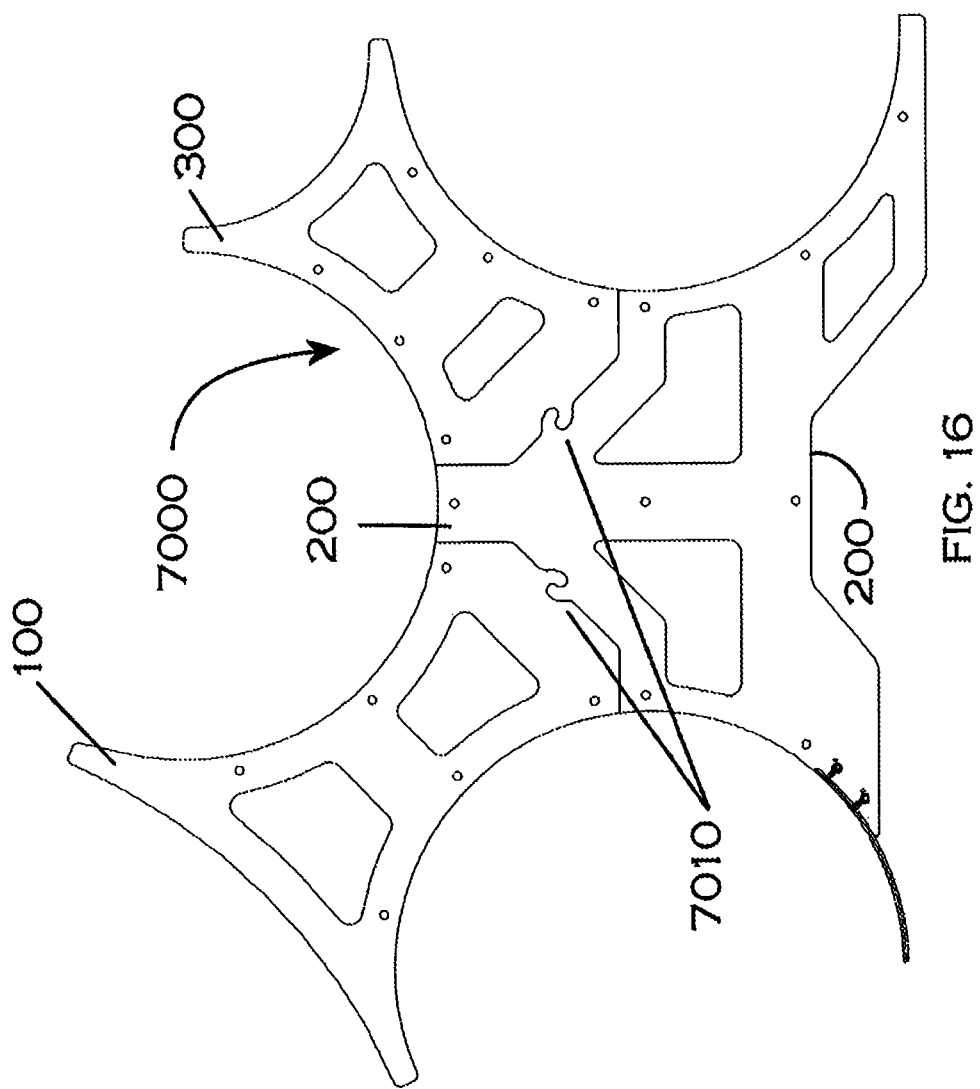
FIG. 16 is a plan view of a second tier of the exemplary center guide of FIG. 13.

Although it has a very different shape, the exemplary center guide 7000, two tiers of which are shown in FIGS. 13 and 16, works on the same principles as the guide 1000 just discussed. With reference to the orientation in FIGS. 13 and 16, biasing magnets draw component parts 100, 300 up-left, and up-right, respectively, into position on a core component 2000, engaging mushroom pins 1160, 1360 and mushroom slots 160, 360, and holding them in the engaged or locked position. Component part 200 is then inserted between components 100 and 300 to provide a mechanical barrier to prevent components 100, 300 from accidentally disengaging from core 2000 by sliding and releasing the mushroom pins 1160, 1360 from the mushroom slots 160, 360. The puzzle type edges 140, 240 and 250, 350 in both tiers interlock component 200 with components 100 and 300, respectively, creating puzzle type locks 7010 to provide further stability within the plane of center guide 7000. In the embodiment illustrated in FIGS. 13 and 16, both tiers use puzzle type locks 7010, but one or more tiers may use a different less intricate mating or interlocking features, including taper locks or cutaway portions.

With respect to attaching star 4000 illustrated in FIGS. 12, and 14-15, the two halves of star 4000 are initially attached to each other. Interlocking edges 4311, 4312 of the first and second halves 4301, 4302 of second tier 4200 are interlocked with each other by sliding the components adjacent each other in a direction orthogonal to the planes of the tiers. Guide 4000 is then placed adjacent core 2000 with the mushroom pins 4160 aligned with mushroom slots 4150. Biasing magnets, if present, assist in rotating guide 4000 to lockingly engage the mushroom pins 4160 in mushroom slots 4150. Locking plate 4500 is then moved toward the handling surface of the first tier 4100. This moves locking protrusions 3020 into the recesses 3050 in mushroom slots 4150 which were created when the mushroom pins 4160 and mushroom slots 4150 engaged. Magnets in locking plate 4500 and the first tier 4100 aid in moving locking protrusions 3020 into the recesses 3050 and in retaining them there.

In the exemplary method of assembling star 4000 described above, the first step designated was attaching the two halves together. In other embodiments the first step may be attaching a first half of star 4000 to core 2000. This may be followed by interlocking the first and second halves of star 4000 together while placing the second half of star 4000 adjacent core 2000 before rotation to lockingly engaging mushroom pins 4160 and slots 4150.

Removing the interchangeable components from core 2000 involves reversing the steps taken to attach the components. The barrier component must first be removed to permit the mushroom pins to disengage from the mushroom slots. Once the locking protrusions 3020, or intermediate component 200, are removed the interchangeable component(s) may be slid or rotated so that the heads of the mushroom pins align with the larger opening in the mushroom slots so the interchangeable component(s) can be lifted off of the core 2000.

In the embodiments discussed in detail, magnetic forces are used to pull component parts into alignment in order to engage mushroom pins and slots, initially attaching the interchangeable component adjacent the core, interlocking edges often engage portions of interchangeable components with each other, and the presence of a blocking component, interposed between two interchangeable component parts or within the mushroom slots secures the locking component in place, aided by biasing magnets, This system and method relies on simple mechanical or magnetic forces by using mechanical forces to reinforce or supplement biasing magnetic forces, and vice versa, creating a durable connection that will withstand the rigors of the filling and capping process, yet which is simple to assemble and disassemble without tools. Because the components are less intricate than traditional fastening methods, they are less prone to damage during assembly, use, or disassembly. Other embodiments will be apparent to those skilled in the art which combine a mechanical, or mechanical supplemented with magnetic force, means of positioning one or more portions of a change part, added physical barriers which are held in place by interlocking edges, magnets, or some combination.

Figure 7:
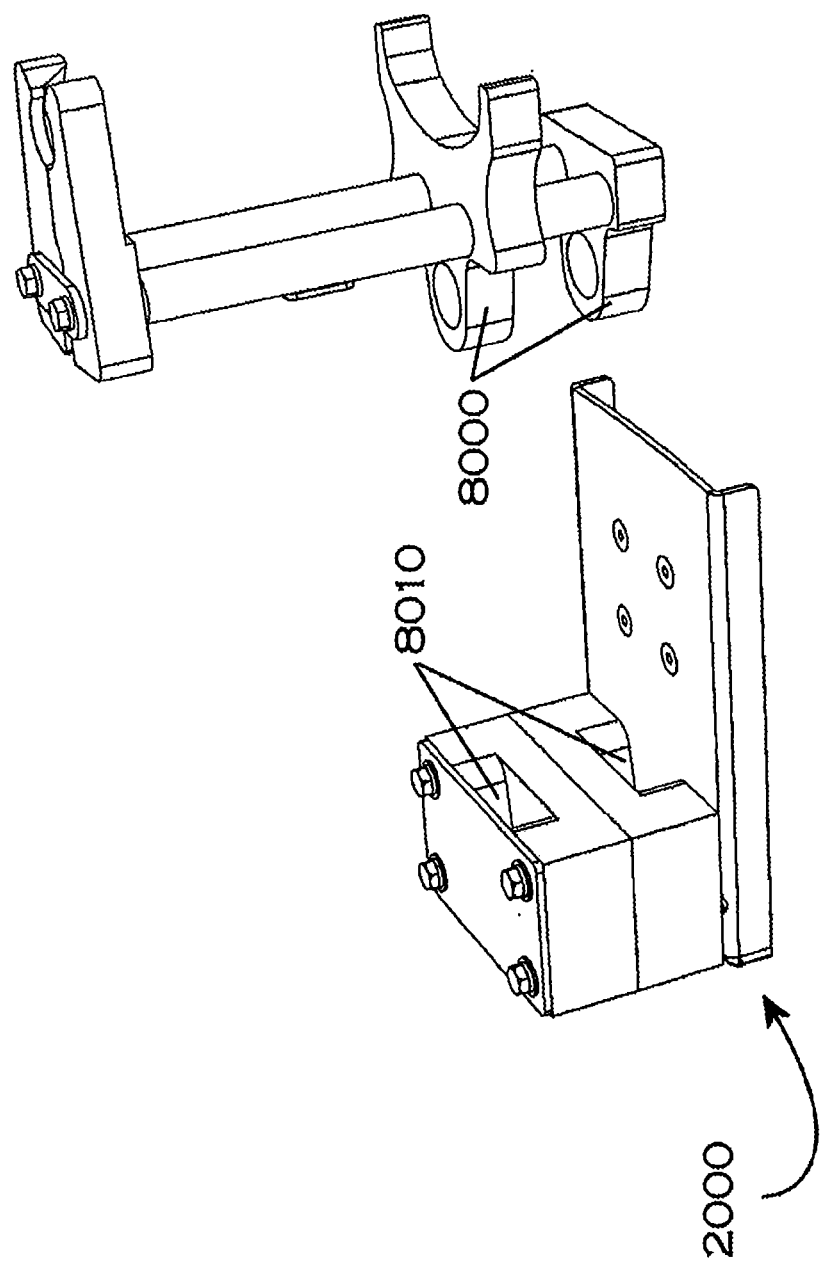
FIG. 7 is a perspective view of an exemplary pedestal in an unlocked state.
Figure 8:
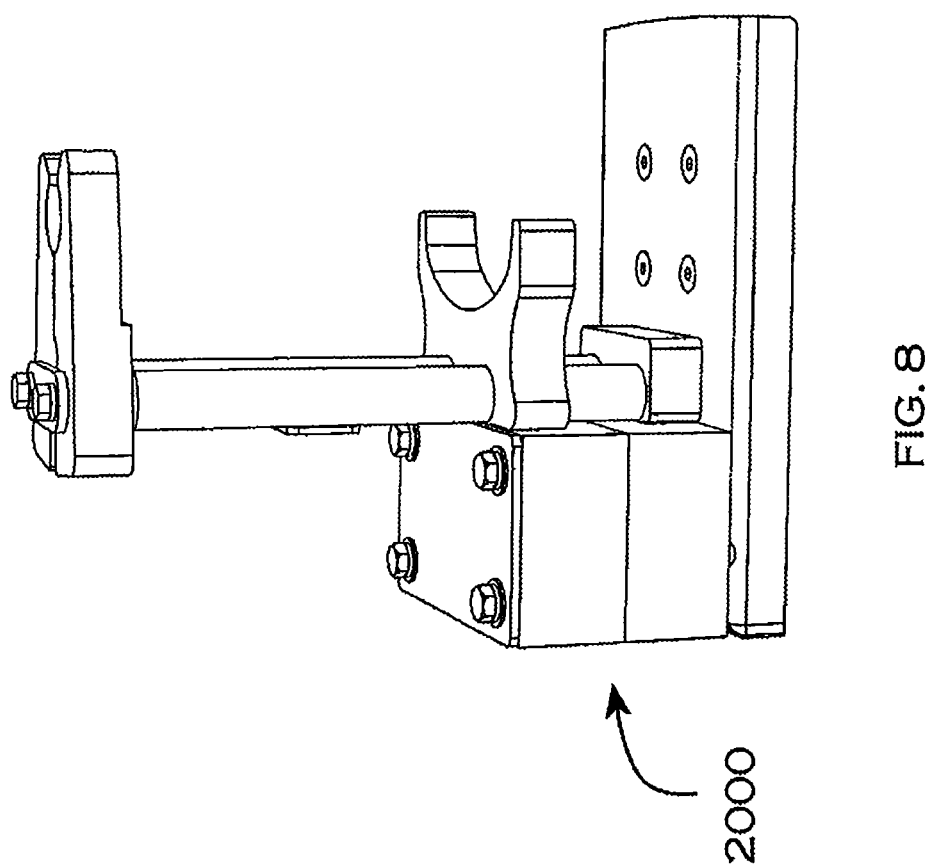
FIG. 8 is a perspective view of an exemplary pedestal in a locked state.

Embodiments of change parts not discussed in detail herein are shown in FIGS. 7 and 8. Illustrated therein is a pedestal used in a filling device. One or more protrusions 8000 on an interchangeable component include a magnet. The protrusions 8000 conform to slots 8010 on the core pedestal mount 2000. Magnets are embedded adjacent the surfaces in the slots 8010, which bias the interchangeable component and core pedestal mount 2000 toward each other, and align and hold the pedestal as illustrated in FIG. 8.

In the exemplary embodiment specifically discussed in most detail the guide comprised three component parts. In other embodiments, it may comprise fewer or more component parts using the same principles, as will be obvious to one skilled in the art.

In the foregoing description certain terms have been used for brevity, clarity, and understanding, however no unnecessary limitations are to be implied therefrom because such terms are used for descriptive purposes and are intended to be broadly construed. Moreover, the descriptions and illustrations herein are by way of examples and the invention is not limited to the exact details shown and described.

In the following claims any feature described as a means for performing a function shall be construed as encompassing any means known to those skilled in the art to be capable of performing the recited function and shall not be limited to the structures shown herein or mere equivalents thereof.

Having described the features, discoveries and the principles of the invention, the manner in which it is constructed and operated and the advantages and useful results attained; the new and useful structures, devices elements, arrangements, parts, combinations, systems, equipment, operations, methods and relationships are set forth in the appended claims.

We claim:

1. A method carried out in connection with a machine, wherein the machine is configured to at least one of fill and close material holding containers,
  wherein the machine includes a generally planar surface,
    wherein the planar surface is configured to operatively support moving containers in the machine,
  wherein the planar surface includes
    at least one surface magnet, and
    at least one pin that extends upward relative to the planar surface and includes a stem portion and an enlarged head portion, wherein the head portion is disposed above the stem portion,
  the method comprising:
  (a) operatively engaging a generally planar guide component and the planar surface,
    wherein the guide component includes
      a generally smooth continuous edge surface, wherein the edge surface is configured to guide containers moving in engagement therewith,
      an elongated slot, wherein the elongated slot includes an enlarged end configured to enable the head portion to pass perpendicularly therethrough, and a closed end configured to enable the stem portion to extend therein but not allow the head portion to pass perpendicularly therethrough, and
      at least one guide magnet in operative connection with the guide component
    wherein operatively engaging the guide component and the planar surface includes
      (i) extending the head portion of an engaged pin through the enlarged end of the elongated slot, and
      (ii) thereafter moving the guide component relative to the engaged pin to an operative position wherein the stem extends in the closed end, wherein in the operative position the at least one guide magnet is generally in attractive alignment with the at least one surface magnet.

2. The method according to claim 1 and further comprising:
  (b) subsequent to (a) operatively engaging a removable lock member and the guide component through movement of the lock member generally perpendicular to the planar surface to an engaged position,
    wherein in the engaged position of the lock member, the lock member is operative to limit movement of the engaged pin relative to the slot so as to prevent the head from moving to the enlarged end,
    wherein the lock member is in operative connection with at least one lock member magnet, wherein the at least one lock member magnet is operative to magnetically hold the lock member in the engaged position.

3. The method according to claim 2 wherein the lock member includes a plate, and wherein the plate includes at least one protrusion, and wherein in (b) in the engaged position the at least one protrusion is operatively engaged with the guide component.

4. The method according to claim 3 wherein the guide component includes a bounding edge, wherein the bounding edge is positionable to extend generally perpendicular to the planar surface, wherein in (b) the bounding edge is positioned generally perpendicular to the planar surface and engages the at least one protrusion, wherein in the engaged position the lock member is operative to prevent relative movement of the guide component in at least one direction parallel to the planar surface.

5. The method according to claim 4
wherein the lock member includes a generally continuous smooth further edge surface, wherein the further edge surface is configured to guide containers moving in engagement therewith, and wherein in (b) with the lock member in the engaged position, the edge surface and the further edge surface provide a generally smooth and continuous container guide surface.

6. The method according to claim 3
wherein in (b) in the engaged position the at least one protrusion of the plate is extended in the elongated slot.

7. The method according to claim 5
wherein in (a)(ii) the guide component is moved in a first direction relative to the planar surface and causes the engaged pin to move in the slot from an attached position wherein the head is perpendicularly aligned with the enlarged portion, to the closed end wherein the guide component is in the operative position, and wherein in (b) with the lock member in the engaged position, the lock member prevents the bounding edge from moving in a second direction generally opposed to the first direction, whereby operative disengagement of the guide component and the planar surface is prevented.

8. The method according to claim 7
wherein a peg extends generally perpendicular from one of the plate and the planar surface, and a peg accepting recess extends in the other of the plate and the planar surface, wherein (b) further includes engaging the peg and recess through movement of the plate generally perpendicular to the planar surface to the engaged position, whereby in the engaged position the plate is generally prevented from moving in a direction generally parallel to the planar surface by engagement of the peg and the recess.

9. The method according to claim 8
wherein the plate includes one lock member magnet and the planar surface includes another lock member magnet, and wherein (b) includes placing the one lock member magnet and the another lock member magnet generally in attractive alignment.

10. The method according to claim 8
wherein the bounding edge includes at least one recess, wherein the at least one recess is configured to engage the at least one protrusion, and wherein in (b) the guide component and the plate are moved relative to one another in a direction generally perpendicular to the planar surface such that the at least one protrusion and the at least one recess are engaged, whereby with the lock member in the engaged position the guide component and the lock member are prevented from moving relative to one another in a direction generally parallel to the planar surface.

11. The method according to claim 7 and further comprising
(c) prior to (b) operatively engaging a further generally planar guide component and the planar surface, wherein the further guide component includes a further component continuous smooth edge surface, wherein the further component continuous edge surface is configured to guide containers moving in engagement therewith, a further elongated slot, wherein the further elongated slot includes a further enlarged end configured to enable the head portion to pass therethrough, and a further closed end configured to enable the stem portion to extend therein but not enable the head portion to pass perpendicularly therethrough, a further bounding edge, wherein the further bounding edge is positionable generally perpendicular to the planar surface, wherein operatively engaging the further guide component and the planar surface includes
(i) extending the head portion of a further engaged pin in the further enlarged end of the further elongated slot, and
(ii) thereafter moving the further guide component generally in a third direction relative to the further engaged pin to a further operative position, wherein in the further operative position the stem of the further engaged pin extends in the further closed end and the further bounding edge extends generally perpendicular to the planar surface, wherein in (b) with the lock member in the engaged position, the lock member prevents the further bounding edge from moving in a fourth direction generally opposed of the third direction, whereby the lock member in the engaged position is operative to prevent disengagement of both the guide component and the further guide component from the planar surface.

12. The method according to claim 11
wherein the further guide component has at least one further guide magnet operatively engaged therewith, and wherein the planar surface includes at least one further surface magnet, wherein in (c) with the further guide component in the further operative position, the at least one further guide component magnet is generally in attractive alignment with the at least one further surface magnet.

13. The method according to claim 12
wherein the lock member includes a further protrusion, wherein the further guide component includes a further bounding edge, wherein the further bounding edge is positionable to extend generally perpendicular to the planar surface, and wherein the further bounding edge includes at least one further protrusion engaging recess, wherein in (b) the further bounding edge is positioned generally perpendicular of the planar surface and the further protrusion and the further protrusion engaging recess are engaged through relative movement in a direction generally perpendicular to the planar surface, wherein the further protrusion and the further protrusion engaging recess are engaged in the engaged position of the lock member, wherein in the engaged position of the lock member the further guide component and the lock member are prevented from moving relative to one another in a direction generally parallel to the planar surface.

14. The method according to claim 13
wherein in (a), (b) and (c) the guide component, the further guide component and the lock member are operatively engaged manually without tools.

15. The method according to claim 13 and further comprising:

(d) subsequent to (c), operatively disengaging the lock member and the planar surface, including manually moving the lock member from the engaged position generally perpendicularly away from the planar surface, (e) subsequent to (d), at least one of
   (i) operatively disengaging the guide component and the planar surface, including moving the bounding edge in the second direction and then perpendicularly away from the planar surface, and
   (ii) operatively disengaging the further guide component and the planar surface, including moving the further bounding edge in the fourth direction and then perpendicularly away from the planar surface.

16. The method according to claim 2
wherein a peg extends generally perpendicular from one of the plate and the planar surface, and a peg accepting recess extends in the other of the plate and the planar surface,
wherein (b) further includes engaging the peg and recess through movement of the plate generally perpendicular to the planar surface to the engaged position, whereby in the engaged position the plate is generally prevented from moving in a direction generally parallel to the planar surface.

17. A method carried out in connection with a machine that is operative to at least one of fill and cap material holding containers, and which machine includes a generally planar surface that operatively supports containers moving in the machine,
comprising:
(a) operatively engaging a generally planar container guide and the planar surface,
   wherein the guide includes
      a generally smooth continuous guide edge configured to guide moving containers in engagement therewith,
      at least one elongated slot, wherein the at least one elongated slot includes
         an enlarged end configured to enable a head of a mounting pin that extends upward relative to the planar surface to pass therethrough, and
         a closed end configured to enable the stem of the pin which is intermediate of the head and the planar surface to extend therein but to prevent the head from passing perpendicularly therethrough,
      at least one guide magnet in operative connection with the guide,
      at least one guide member engaging surface,
   wherein operatively engaging the guide and the planar surface includes
      (i) extending the head of the mounting pin in the enlarged end of the slot, and
      (ii) thereafter moving the guide relative to the pin generally parallel to the planar surface in a direction such that the pin moves in the slot from the enlarged end toward the closed end thereof to an operative position, and wherein the at least one guide magnet is operative to magnetically hold the guide in the operative position, (b) with the guide in the operative position, engaging at least one lock member engaging surface of a manually releasable lock member and the at least one guide member engaging surface,
   wherein engaging the at least one guide member engaging surface and the at least one lock member engaging surface includes moving the lock member generally perpendicular to the planar surface to an engaged position, wherein engagement of the at least one guide member engaging surface and the at least one lock member engaging surface in the engaged position is operative to prevent the guide from moving relative to the pin from the operative position in a second direction opposed to the first direction of the enlarged end of the slot.

18. The method according to claim 17
wherein (b) includes operatively engaging the lock member and the planar surface, wherein the lock member includes at least one lock member magnet, and wherein the at least one lock member magnet is operative to magnetically hold the lock member and the planar surface in the engaged position.

19. The method according to claim 17
wherein the peg extends generally perpendicular from one of the lock member and the planar surface and a peg engaging recess extends in the other of the lock member and the planar surface,
wherein (b) includes engaging the peg and the peg engaging recess.

20. The method according to claim 17
wherein at least one surface magnet is in operative engagement with the planar surface,
wherein in (b) in the operative position of the guide the at least one guide member magnet is in generally attractive alignment with the at least one surface magnet.

21. The method according to claim 17
wherein the lock member includes a further generally continuous further guide edge configured to guide containers in moving engagement therewith, wherein in (b) in the engaged position, the guide edge and the further guide edge form a generally smooth and continuous guide surface.

22. The method according to claim 17
wherein the guide member engaging surface includes a guide bounding edge surface and wherein the lock member engaging surface includes a lock bounding edge surface, and
wherein one of the guide member engaging surface and lock member engaging surface includes a protrusion and the other of the guide member engaging surface and lock member engaging surface includes a recess configured to inter-engage with the protrusion,
and wherein in (b) in the engaged position the protrusion is in inter-engaging relation with the recess.

23. The method according to claim 17
wherein the guide member engaging surface includes at least one surface bounding the elongated slot and the lock member engaging surface includes a protrusion on the lock member,
and wherein in (b) in the engaged position the protrusion extends in the elongated slot.

\* \* \* \* \*